July 25, 1961
E. W. PANICCI ET AL
2,993,415
COMBINED CONTINUOUS LINKLESS SUPPLIER AND
CARTRIDGE FEED MECHANISM
FOR AUTOMATIC GUNS
Filed July 10, 1959
17 Sheets-Sheet 2
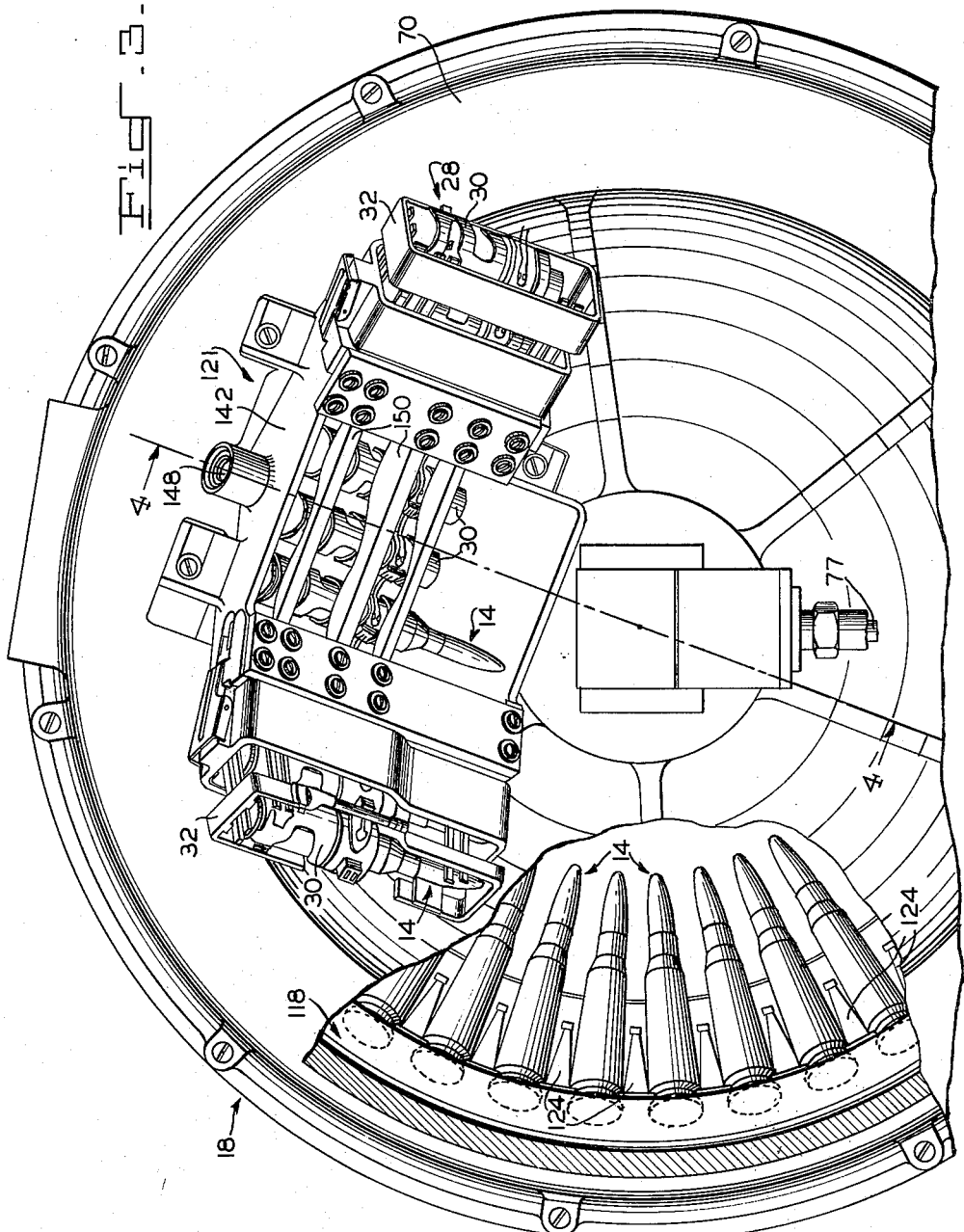
INVENTORS,
Harlan C. Clark
Elio W. Panicci
BY S. J. Rotondi &
A. J. Dupont

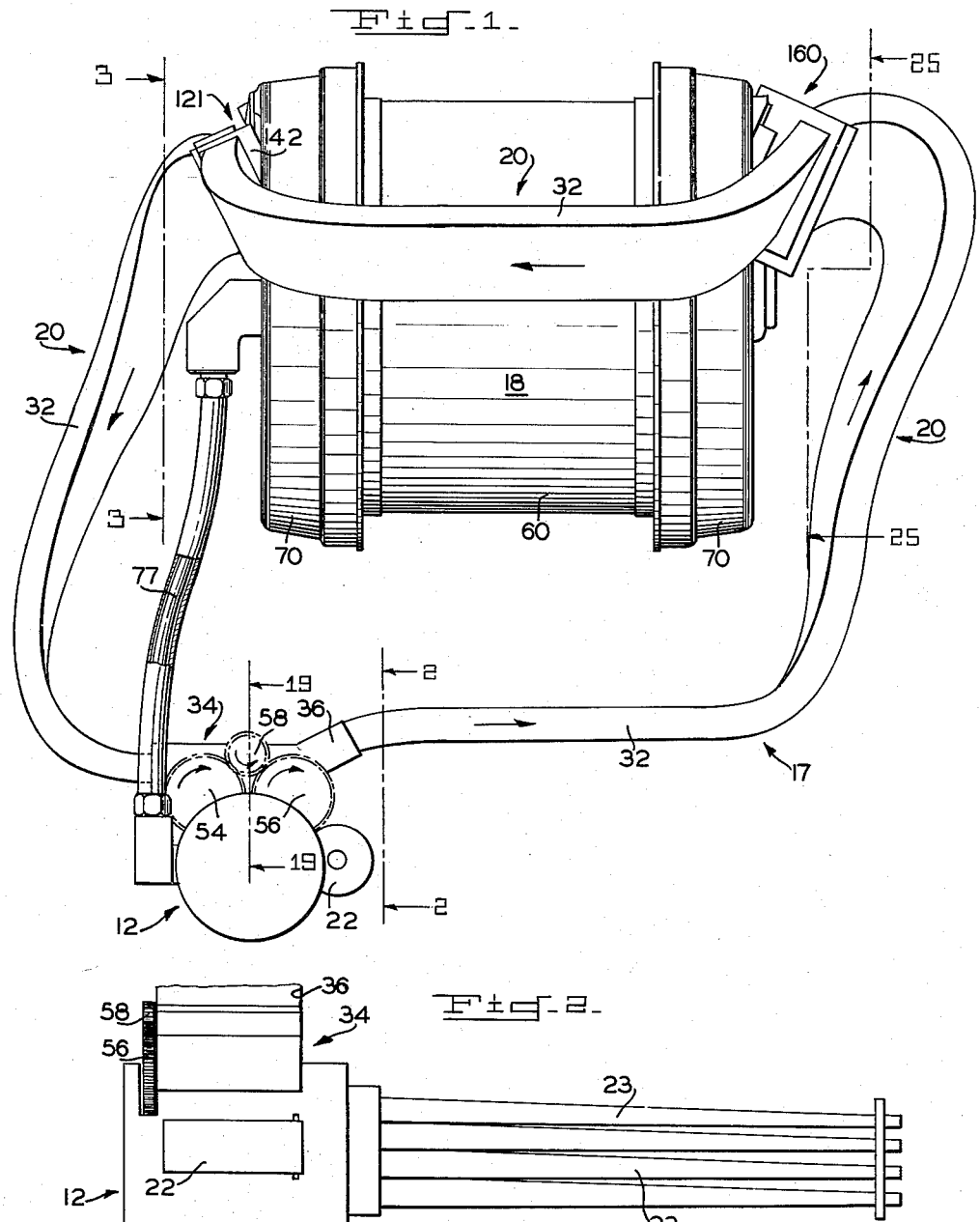

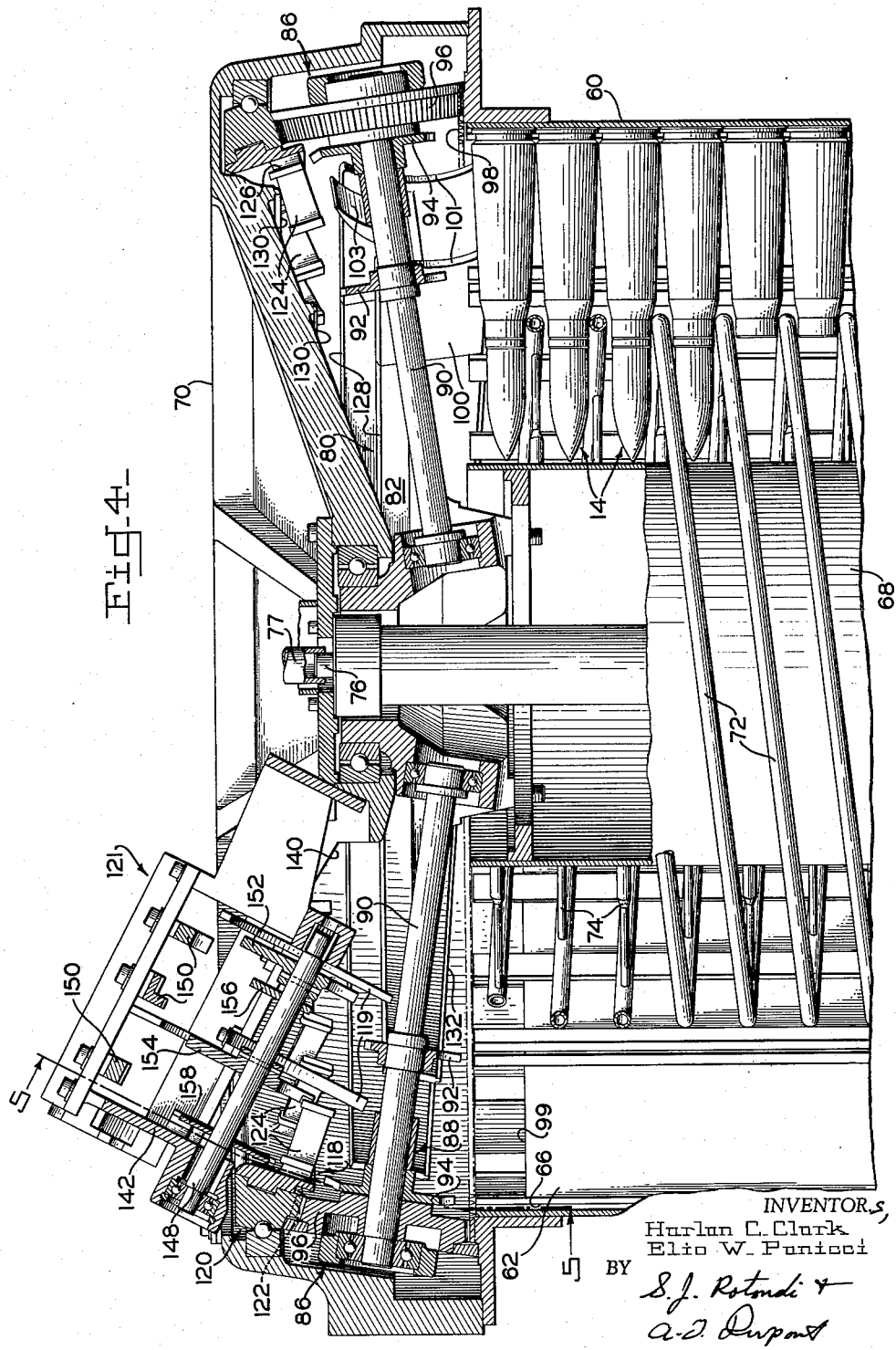

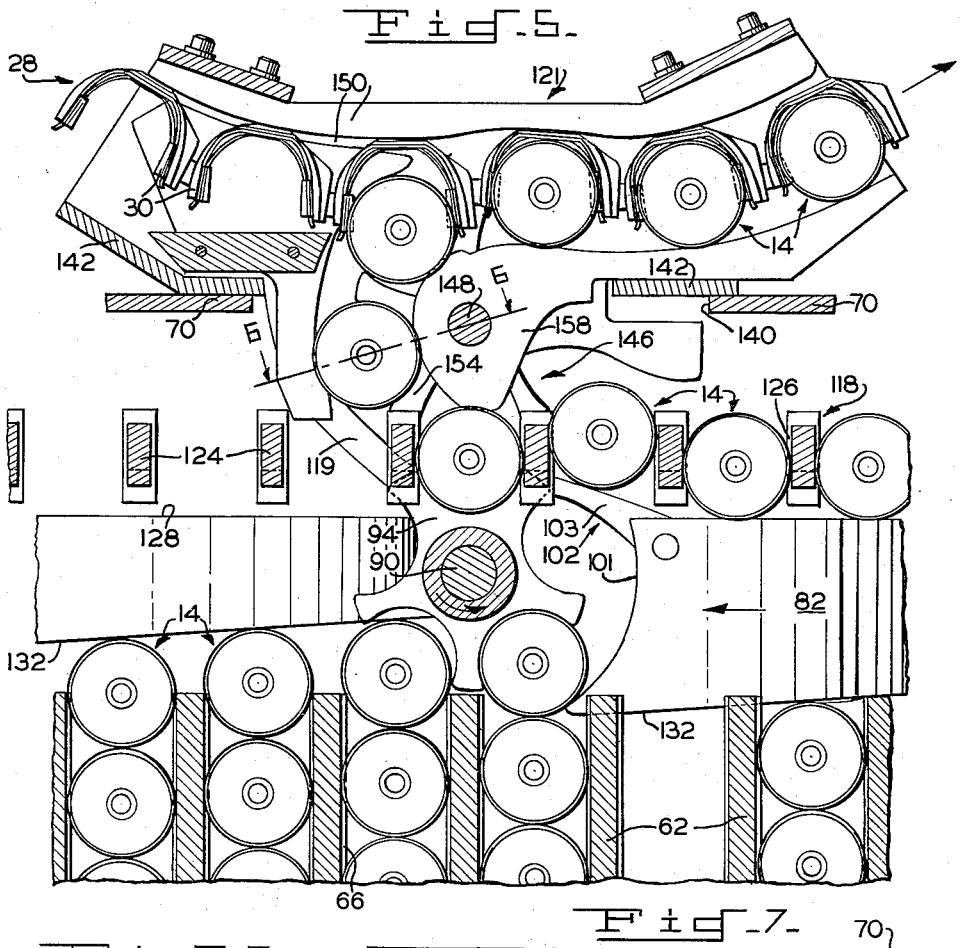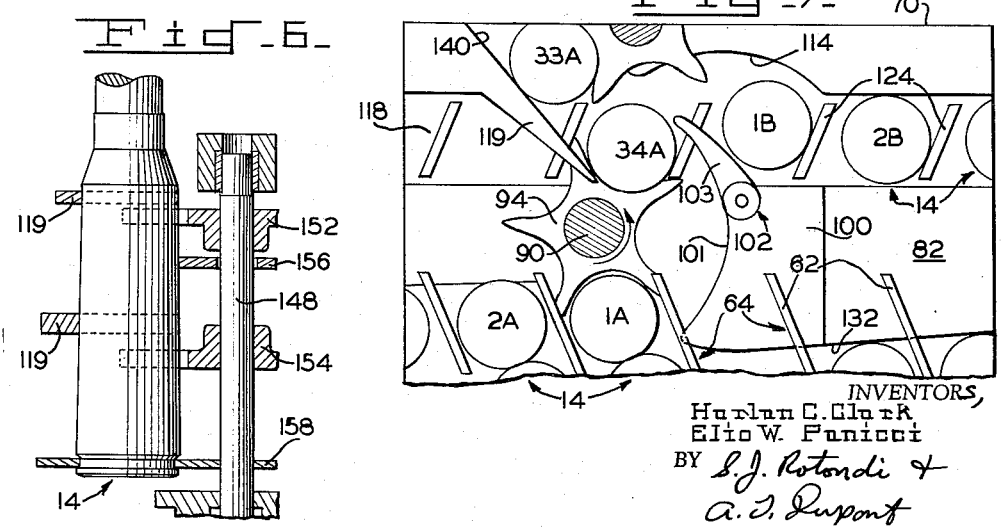

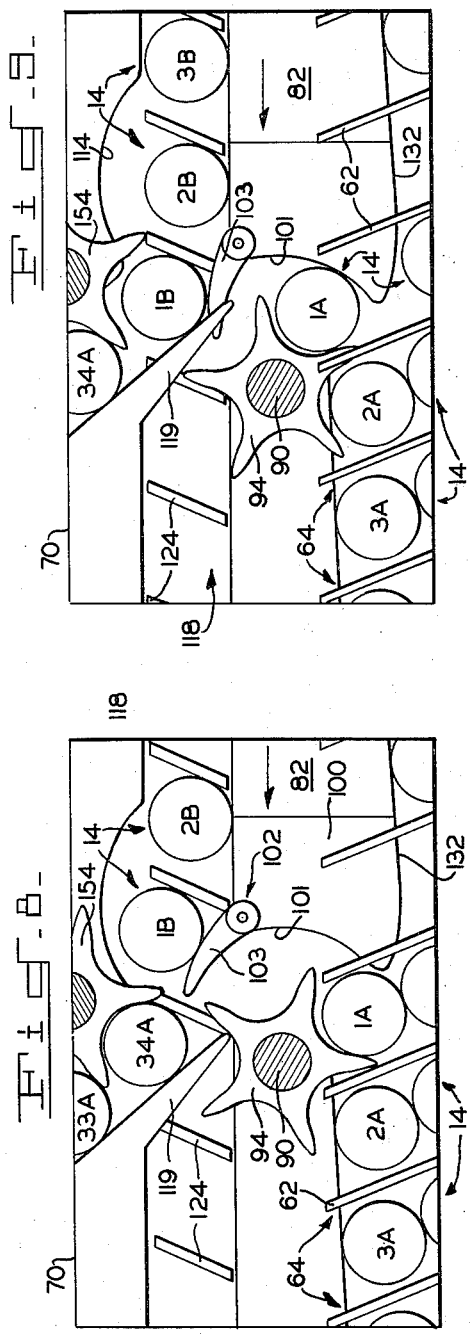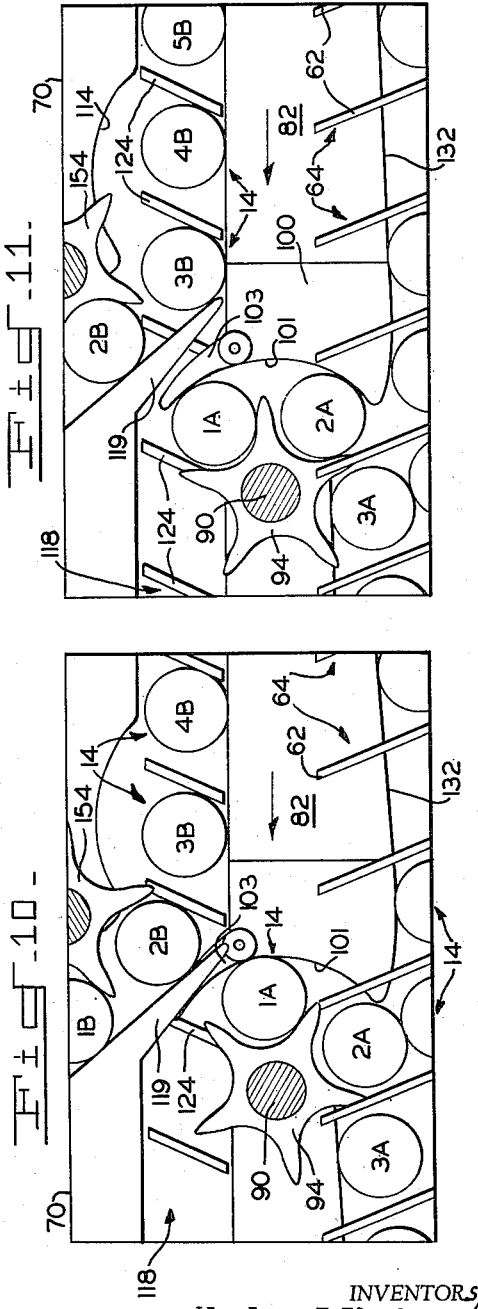

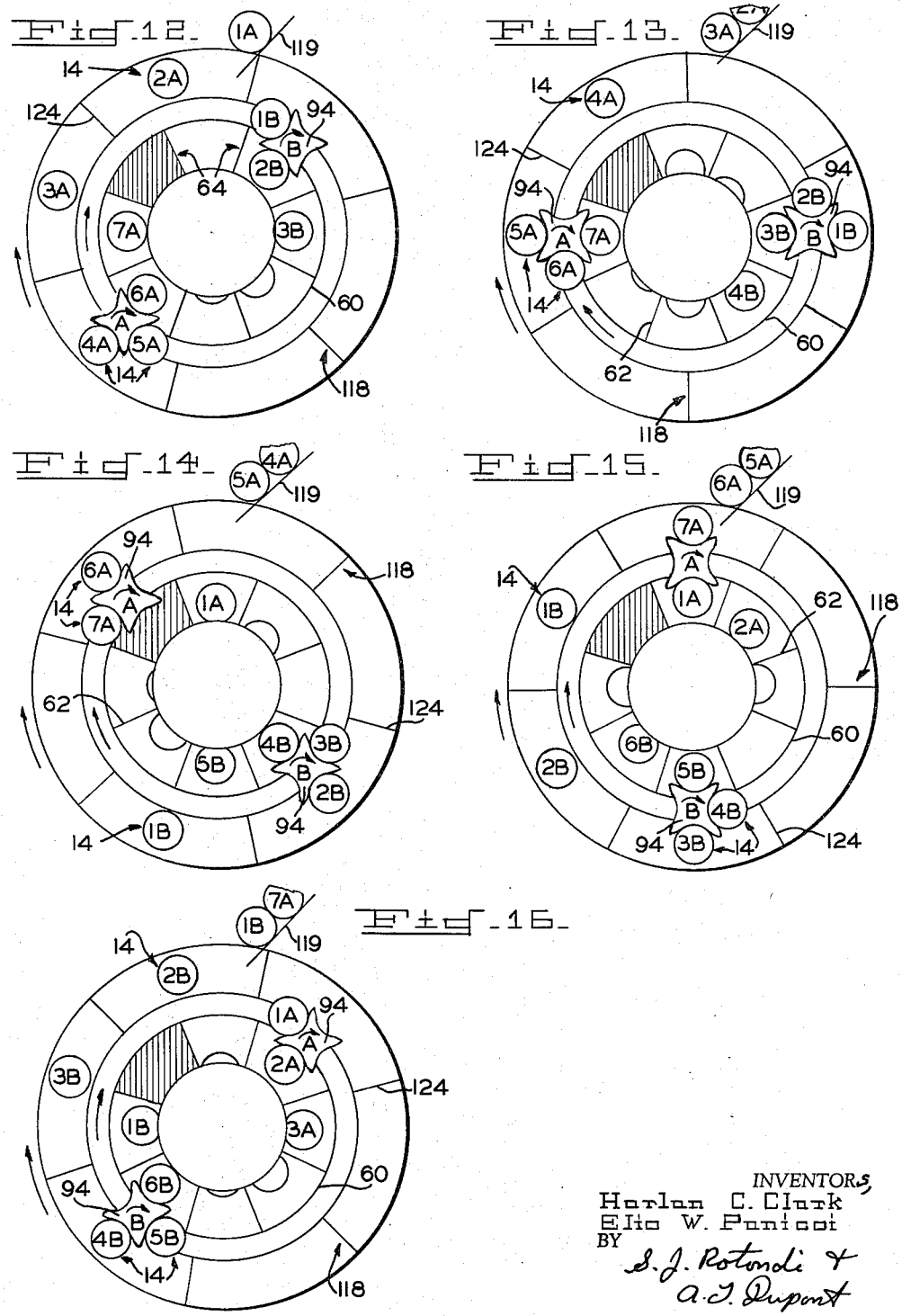

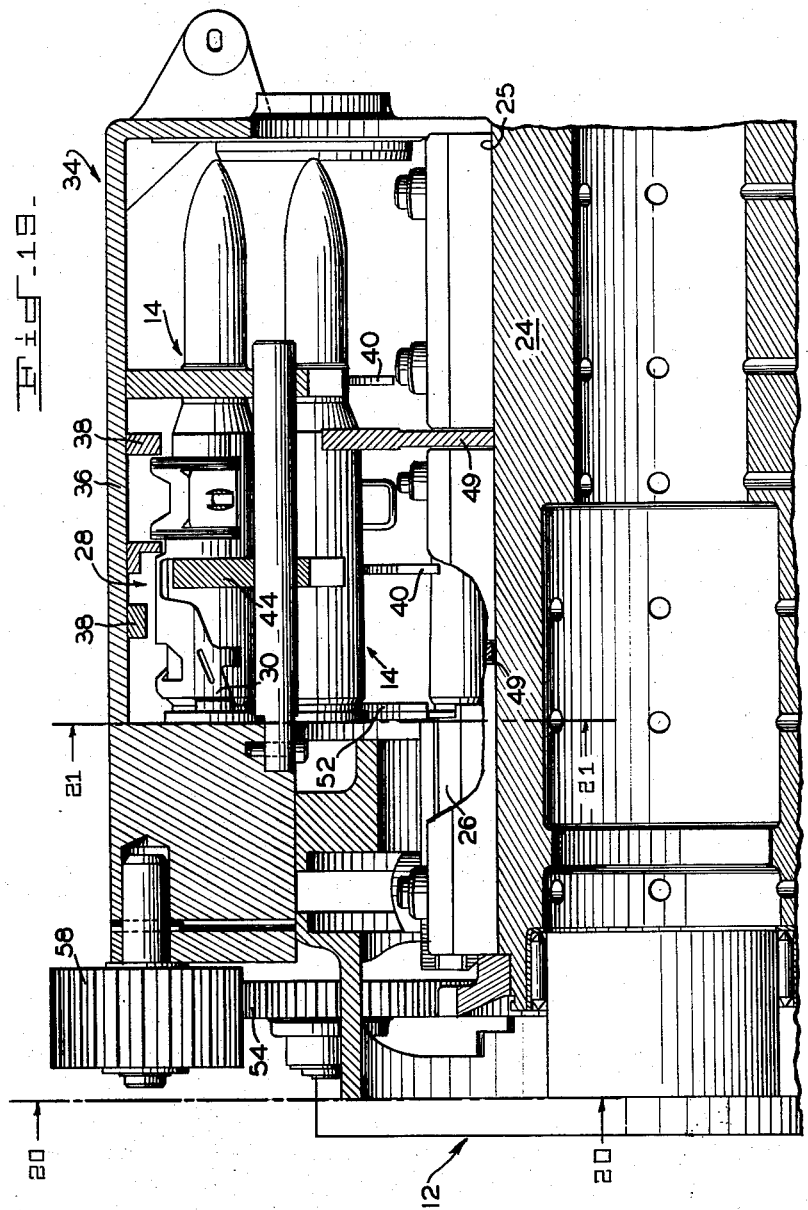

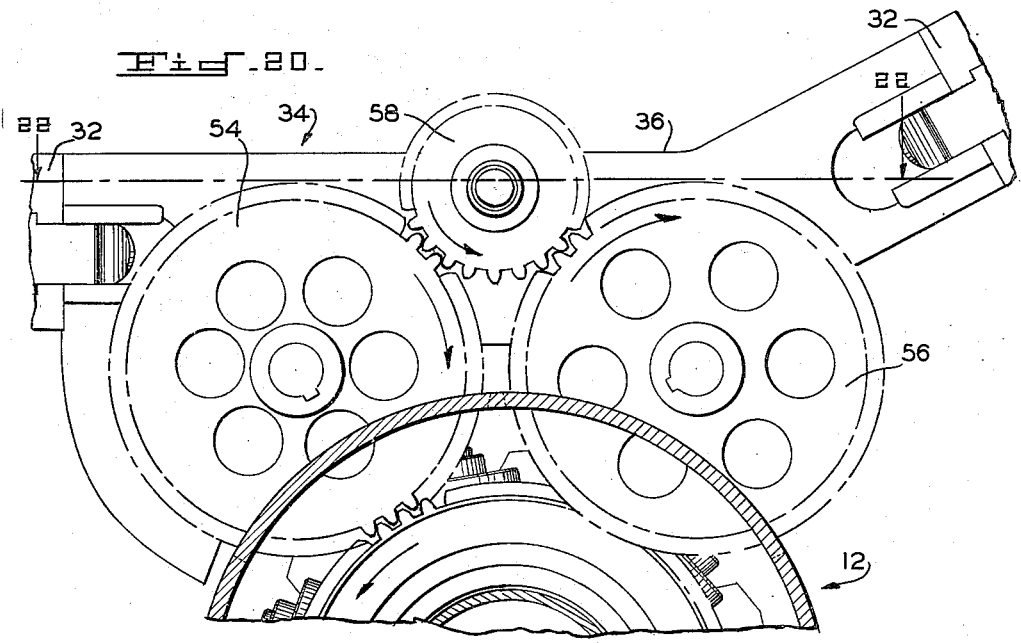
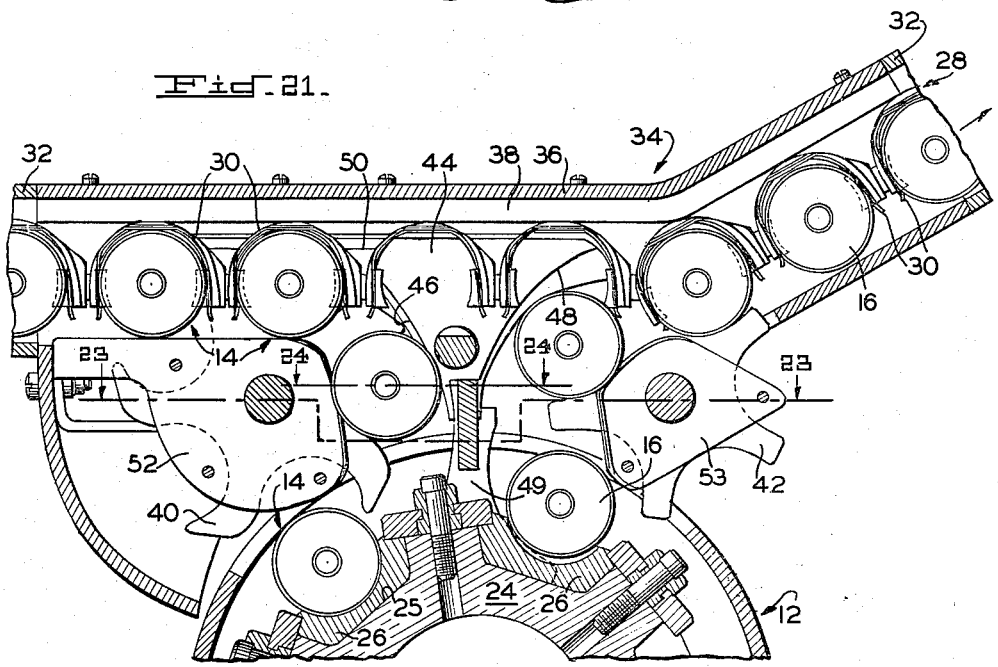

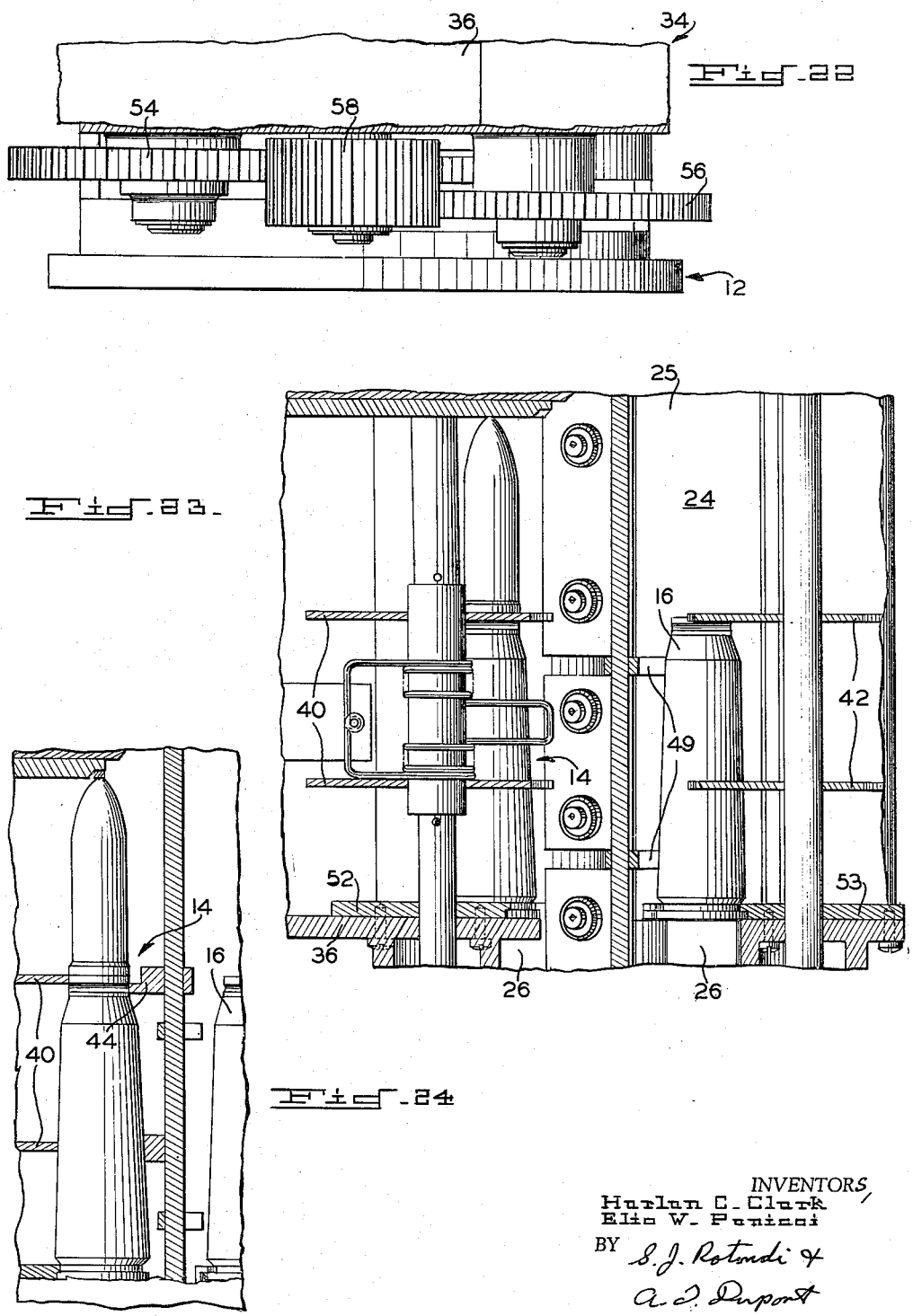

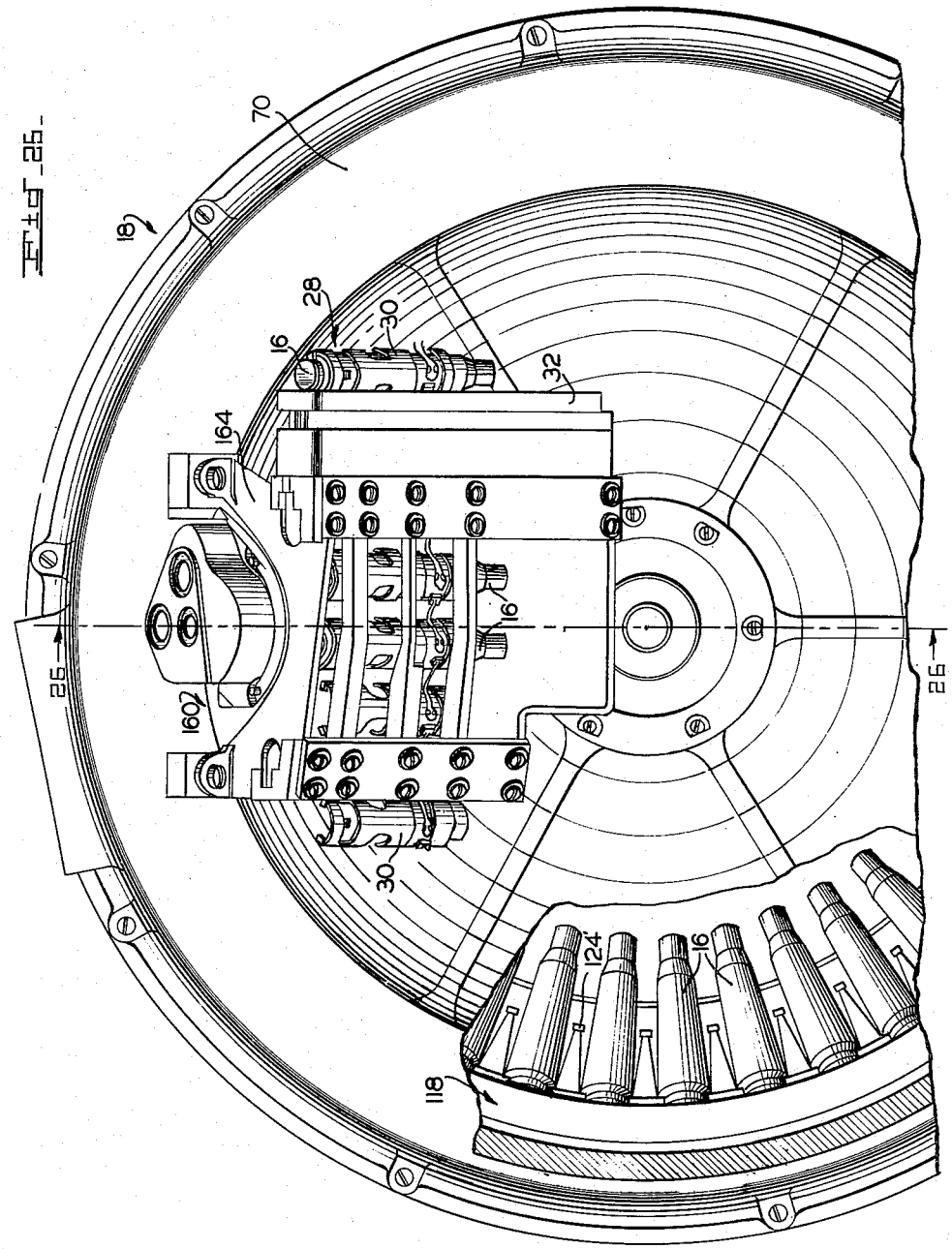

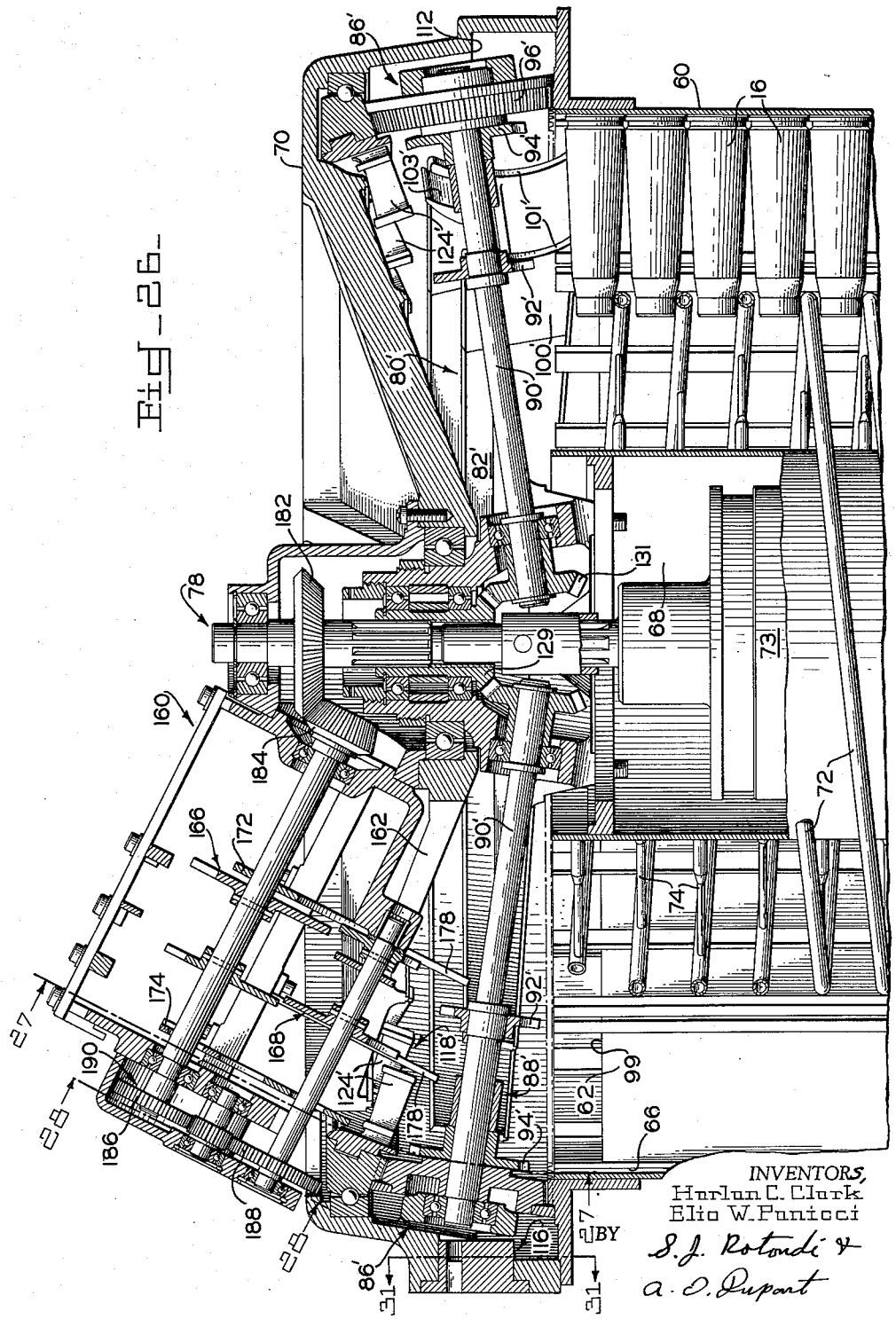

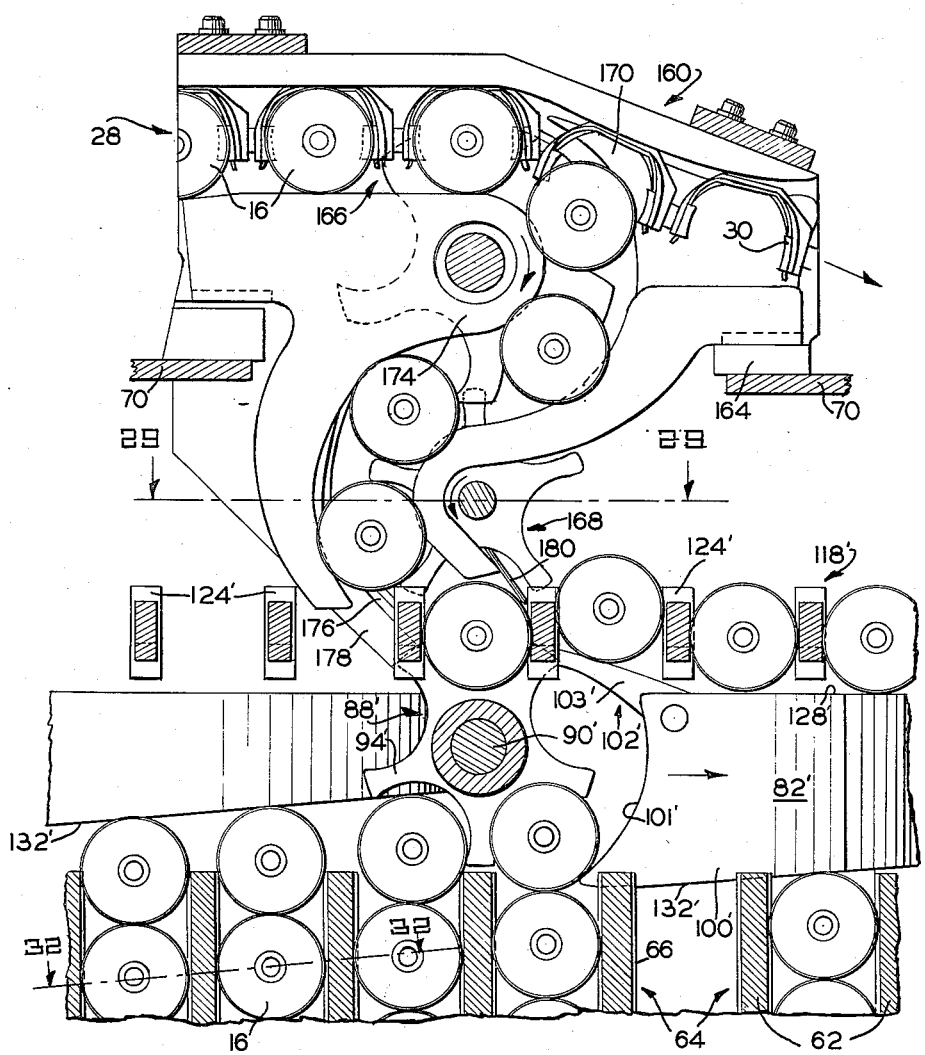

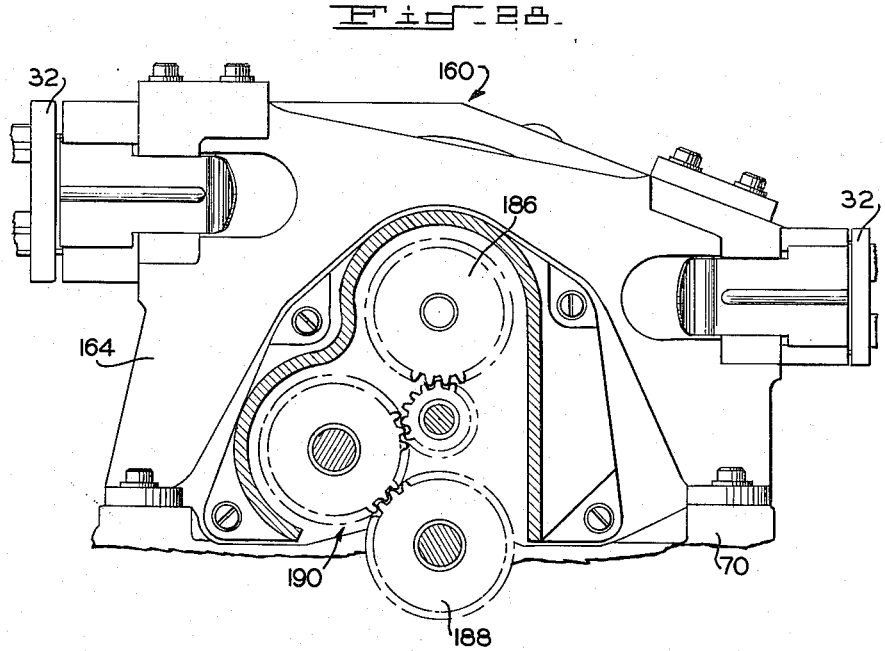
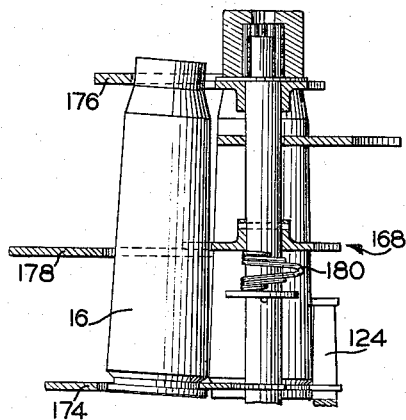

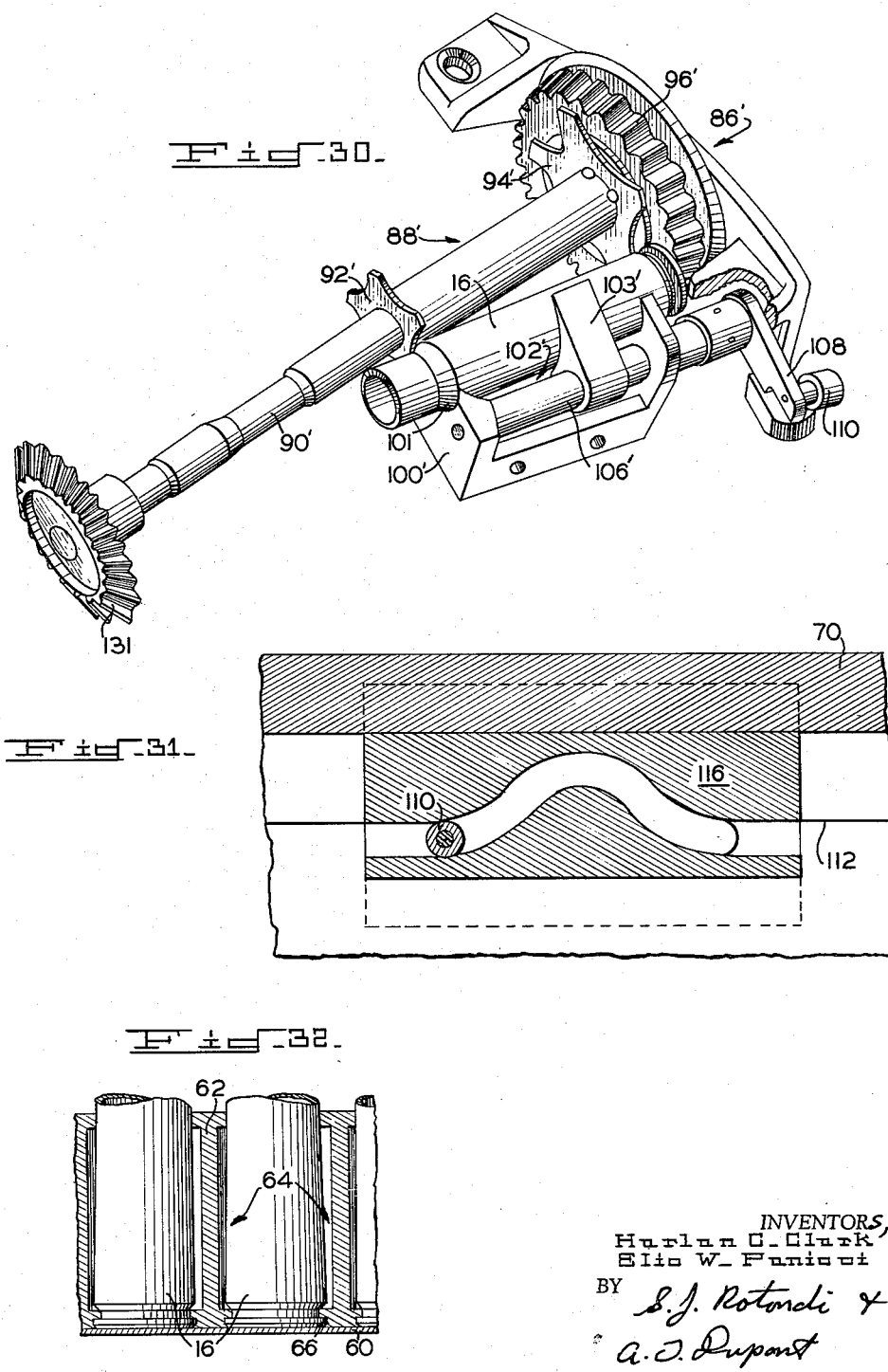

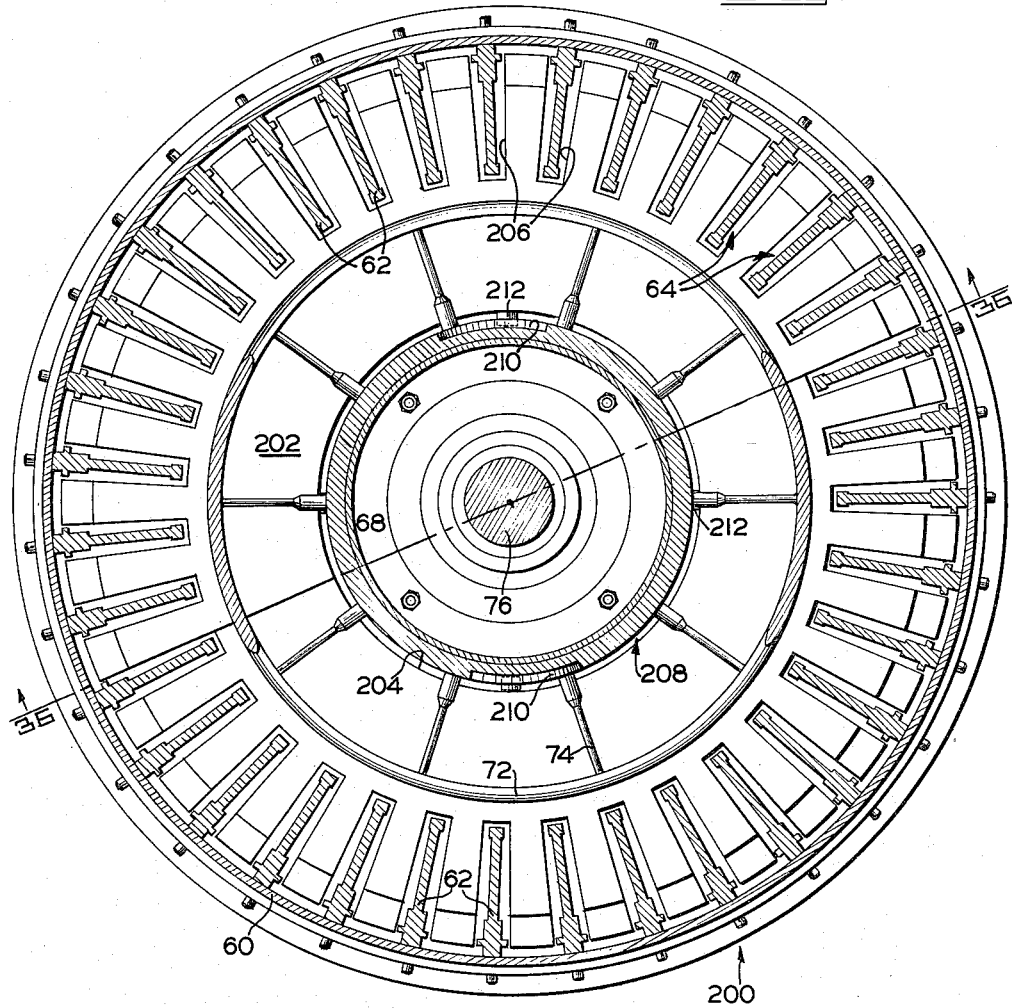
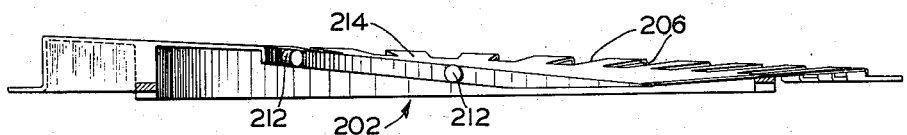

United States Patent Office 2,993,415
Patented July 25, 1961

2,993,415
COMBINED CONTINUOUS LINKLESS SUPPLIER AND CARTRIDGE FEED MECHANISM FOR AUTOMATIC GUNS

Elio W. Panicci, Torrington, and Harlan C. Clark, Oxford, Conn., assignors to the United States of America as represented by the Secretary of the Army
Filed July 10, 1959, Ser. No. 826,383
11 Claims. (Cl. 89—33)

This invention relates to feeders for supplying cartridges to automatic guns.

In the past, the most satisfactory means of storing cartridges for use by automatic guns and of conveying the stored cartridges to the guns and the fired cases therefrom, when they are not to be jettisoned, have been by belts formed by cartridge carrying links.

However, as the rate of fire of automatic guns, especially those used in aircraft, has been increased, the rapidity with which the belts are moved has resulted in increased forces of acceleration and deceleration acting thereagainst during the rapid changes in motion thereof and, therefore, linked belts have become unsatisfactory as such forces cause frequent separation and breakage of the links. Moreover, with the increased rate of fire, there is a corresponding need for a larger reservoir of cartridges which must be stored in a minimum of space and with a minimum of weight.

It is, therefore, an object of this invention to provide for automatic guns a feeding device whereby cartridges are disconnectedly stored in a supplier which serially installs the cartridges in an endless conveyor belt extending between a gun and the supplier.

Another object of this invention is to provide a feeding device which compactly stores unbelted cartridges in a stationary cylindrical drum having at each end a transfer mechanism which cooperates with exit and entrance units and an endless conveyor belt in moving live rounds from the exit end of the storage drum to the gun with a minimum of acceleration and transferring fired cases with a minimum of deceleration from the gun to the entrance end of the drum where the fired cases are stored in the spaces made available by the removal of the cartridges and are used to progressively move the live rounds toward the exit end of the drum to produce an endless flow of cartridges and fired cases through the feeding device and gun.

Figure 17:
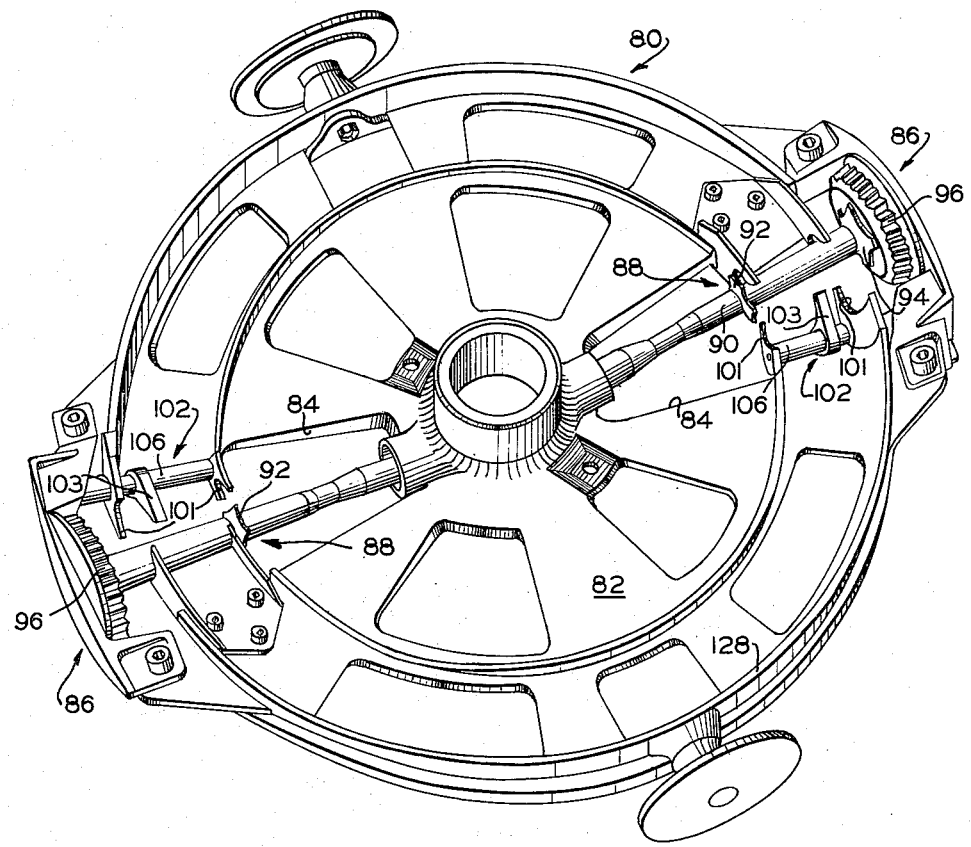
Figure 18:
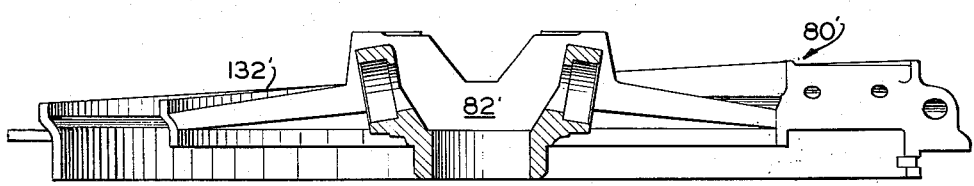
Figure 33:
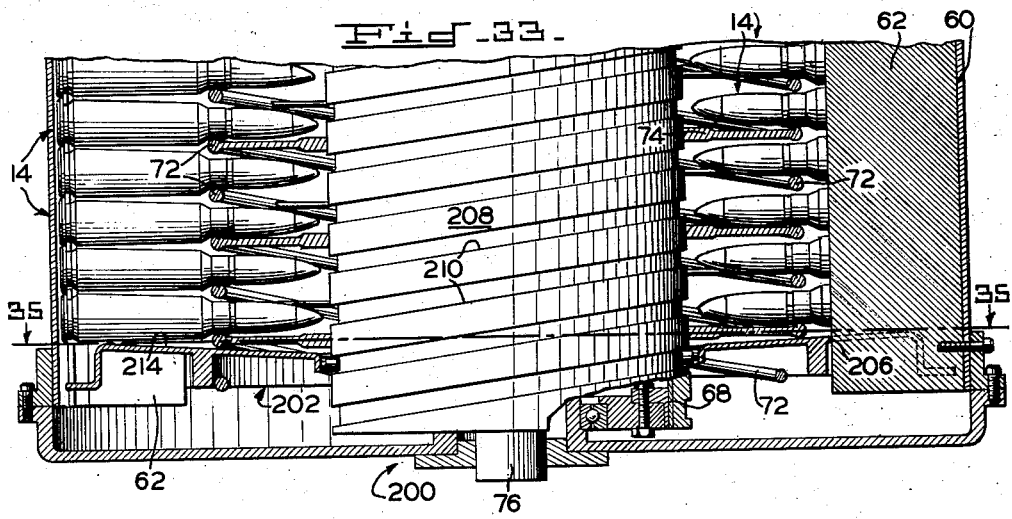
Figure 34:
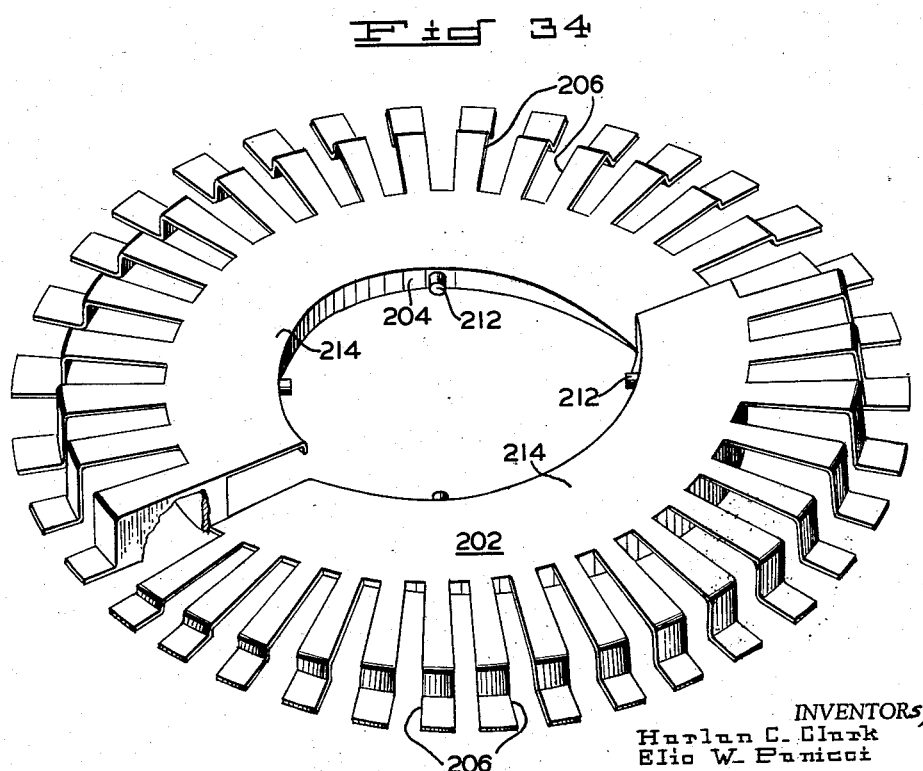

The specific nature of the invention as well as other objects and advantages thereof will clearly appear from a description of a preferred embodiment as shown in the accompanying drawings in which:

FIG. 1 is a schematic view of the assembled gun and supplier;
FIG. 2 is a view taken along line 2—2 of FIG. 1;
FIG. 3 is a view taken along line 3—3 of FIG. 1 showing the exit end of the supplier;
FIG. 4 is a view taken along line 4—4 of FIG. 3 with only the row of cartridges and/or cases positioned along the section line on one side of the drum being shown for clarity of illustration;
FIG. 5 is a view taken along line 5—5 of FIG. 4;
FIG. 6 is a view taken along line 6—6 of FIG. 5;
FIGS. 7–11 are schematic views showing the progression of the cartridges from the drum through a transfer mechanism;
FIGS. 12–16 are diagrammatic views showing the cooperation between the pair of inner transfer devices in one of the transfer mechanisms;
FIG. 17 is a top view of the transfer mechanism at the exit end of the drum;
FIG. 18 is a longitudinally cross-sectioned view of the scoop disc of the entrance end;
FIG. 19 is a view taken along line 19—19 of FIG. 1;
FIG. 20 is a view taken along line 20—20 of FIG. 19;
FIG. 21 is a view taken along line 21—21 of FIG. 19;
FIG. 22 is a view taken along line 22—22 of FIG. 20;
FIG. 23 is a view taken along line 23—23 of FIG. 21;
FIG. 24 is a view taken along line 24—24 of FIG. 21;
FIG. 25 is a view taken along line 25—25 of FIG. 1 showing the entrance end of the supplier;
FIG. 26 is a view taken along line 26—26 of FIG. 25;
FIG. 27 is a view taken along line 27—27 of FIG. 26;
FIG. 28 is a view taken along line 28—28 of FIG. 26;
FIG. 29 is a view taken along line 29—29 of FIG. 27;
FIG. 30 is a perspective view of one of the inner transfer devices at the entrance end of the drum;
FIG. 31 is a view taken along line 31—31 of FIG. 26;
FIG. 32 is a view taken along line 32—32 of FIG. 27;
FIG. 33 is a fragmentary view of a longitudinal cross-section of an alternate embodiment;
FIG. 34 is a perspective view of the bulkhead in the alternate embodiment;
FIG. 35 is a view taken along line 35—35 of FIG. 33; and
FIG. 36 is a view taken along line 36—36 of FIG. 35 showing the beginning and end of one of the cam surfaces on the bulkhead.

Shown in the figures is an automatic gun 12 for firing cartridges 14 which are provided with tapered cases 16 having neck portions for receiving projectiles, and a feeding device 17 comprised of a supplier 18 and a conveyor assembly 20 which cooperates with the supplier in feeding the cartridges initially stored therein to the gun and in returning the fired cases from the gun to the supplier in a continuous flow.

Gun 12 is of a conventional electrically fired type in which the operating mechanism is powered by an electric motor 22. Gun 12 is provided with a plurality of barrels 23 and a rotor 24 having channels 25 which correspond in number to the barrels and are disposed to receive the cartridges 14 so as to be simultaneously alignable with the barrels. The cartridges are moved forwardly into the barrels 23 from rotor 24 by longitudinally actuated bolts 26 (FIG. 19) which also extract the fired cases 16 from the barrels along the channels 25 in the rotor.

Conveyor assembly 20 includes an endless conveyor belt 28 composed of a plurality of articulately joined links 30 which resiliently grip the cases 16 for lateral removal and installation and which include means for positioning the cartridges longitudinally by releasably engaging the extractor grooves of the cases. Conveyor belt 28 is slidingly supported in its movement between gun 12 and supplier 18 by flexible chuting 32 which also serves to prevent interference with the movement of the conveyor belt and protects the cartridges 14 carried thereby.

Conveyor assembly 20 communicates with gun 12 by means of a loading unit 34 which replaces the conventional feeder of the gun and serves the double purpose of transferring cartridges 14 from conveyor belt 28 to rotor 24 and of replacing the fired cases 16 in the conveyor belt after they are extracted from the barrels 23 and replaced in the rotor. Loading unit 34, as best shown in FIGS. 19–23, includes a housing 36 which is mounted to the receiver of gun 12 and is provided with a pair of rails 38 for slidingly supporting conveyor belt 28 during passage thereof through the housing. Rotatably mounted in housing 36, respectively adjacent the entrance thereto and the exit therefrom, is a feeder sprocket 40 and a loading sprocket 42 and interposed therebetween is a stripper-guide member 44 which is substantially triangular in configuration and is provided with an arcuate guide surface 46 facing the feeder sprocket and a similarly arcuated guide surface 48 facing the loading sprocket.

Feeder sprocket 40 is connected by conventional gear means to rotor 24 for synchronized rotation therewith and is disposed to engage successive ones of the cartridges 14 carried by conveyor belt 28. Guide surface 46 joins the base of stripper-guide member 44 to form a prong portion 50 which is disposed so as to project between the cartridges 14 and the engaging links 30 in the moving conveyor belt 28 for prying separation. After separation, the cartridges 14 are carried by feeder sprocket 40 along guide surface 46 to rotor 24 to be received by successive ones of the channels 25 for immediate pickup by the corresponding ones of the bolts 26 to be chambered thereby in the respective ones of the barrels 23. At the same time, conveyor belt 28 is pulled through housing 36 by feeder sprocket 40 and the empty links 30 are moved along the rails 38 and into registry with the loading sprocket 42 to receive the fired cases 16 delivered to guide surface 48 from rotor 24 by means of a guide bar 49 mounted in gun 12. Such loading sprocket 42 is spaced, relative to rails 38, so that the cases 16 are pressed thereby into the empty links 30 moving along the rails 38 as they come into registry. A guide 52 is fixedly mounted to the entrance end of housing 36 so as to be slidingly received by the extractor grooves in the cases 16 for preventing longitudinal displacement thereof when passing along guide surface 46. The engaging surface of guide 52 is disposed eccentric to feeder sprocket 40 so as to cam the cartridges 14 carried thereby into rotor 24. Another guide 53 slidingly engages the extractor grooves of the fired cartridge cases 16 during transfer to the empty links 30. Feeder sprocket 40 is connected to loading sprocket 42 for synchronized rotation therewith and, in the same direction, by a feeder gear 54 which is axially mounted to the feeder sprocket and is connected to a loading gear 56, axially mounted to the loading sprocket, by means of an idler gear 58.

Supplier 18, as best shown in FIGS. 1, 3, 4 and 26, includes a drum 60 which is open at both ends and is provided with thirty-five partitions 62 which project radially inward from the inner surface thereof and extend longitudinally therealong from one end of the drum to the other. The partitions 62 are spaced to form thirty-five storage spaces 64 which receive columns of cartridges 14 and/or fired cases 16 so as to be slidable therein from one end of the drum to the other and the partitions are so shaped at their inner ends as to maintain lateral separation between the neck portions of the cartridge cases. One of the storage spaces is left empty for a reason to be explained hereinafter. The cartridges 14 and/or cases 16 are positioned in the storage spaces 64 with their front ends pointing toward the drum axis and their bases adjacent the inner surface of drum 60. Projecting oppositely from the sides of the partitions 62, and extending therealong from one end of drum 60 to the other, are guides 66 (FIGS. 4 and 26) which are slidingly received by the extractor grooves of the cartridges and fired cases to prevent the longitudinal displacement thereof towards the drum axis.

A cylindrical inner shell 68 (FIG. 26) is concentrically mounted in drum 60 for rotation therein and is held in place by a pair of similar covers 70 which are mounted to opposite ends of the drum. A pair of helical rods 72, as shown in FIGS. 4 and 26, encircle inner shell 68 and are mounted symmetrically thereto by radial brackets 74. The rods start at diametrically opposed positions at one end of the inner shell 68 and progress helically and with alternating coils to diametrically opposed positions at the opposite end thereof. The rods are disposed so as to slidingly engage the neck portions of the cases 16 for maintaining the axes thereof normal to the axis of drum 60 while being moved through drum 60 in a double helix as hereinafter explained.

Disposed within inner shell 68 is a speed reducer unit 73 (FIG. 26) which is supported between the covers 70 so as to be secured against rotation and which is adapted to synchronize supplier 18 to the needs of gun 12. Extending from speed reducer unit 73 towards the exit end of the drum is an input shaft 76 (FIG. 4) which is connected to motor 22 by a flexible drive shaft 77 (FIG. 3). Speed reducer unit 73 is connected, as hereinafter described, to the moving parts of supplier 18 by an output shaft 78 which extends along the axis of drum 60 to the entrance end thereof.

A transfer mechanism 80, as best shown in FIG. 17, is rotatably mounted, as hereinafter described, to the exit end of drum 60 so as to be inclosed by the cover 70 mounted thereto. Such transfer mechanism includes a circular scoop disc 82 which has a diameter substantially the same as that of drum 60 and is securely fixed to the adjacent end of inner shell 68 for rotation therewith. Scoop disc 82 is interrupted by a pair of diametrically opposed openings 84 through which the end ones of the cartridges 14 in the storage spaces 64 are transferred to the outer side of the scoop disc by a pair of inner transfer devices 86, as shown in FIGS. 4, 17, 26 and 30, mounted to the scoop disc adjacent openings 84, as hereinafter described. Each of the inner transfer devices 86 includes a sprocket assembly 88 comprised of an axle 90 to which there is mounted an inner sprocket 92, an outer sprocket 94 and a pinion gear 96 which has meshing engagement with a ring gear 98 mounted to the adjacent rim of drum 60. Thereby, rotation of scoop disc 82 by inner shell 68 is imparted to sprocket assemblies 88 as the pinion gears 96 are driven around ring gear 98. Inner sprocket 92 and outer sprocket 94 are both of five-tooth type and are arranged to respectively engage the neck portions and the extractor grooves of the end ones of the cartridges 14 in the storage spaces 64. In order to obtain proper rolling contact between the sprockets 92 and 94 and the end ones of the cartridges 14, the pitch circles of such sprockets are arranged to form a cone having its apex at the axis of drum 60 as the pitch diameters of inner sprocket 92 and outer sprocket 94 should vary in proportion to the distances thereof from the axis of the drum as is best illustrated by FIGS. 4 and 26.

The angular relationship of axles 90 to a plane normal to the axis of drum 60 is determined by the sine of one-half the cone angle being equal to the ratio of the number of teeth in the sprockets 92 and 94 to the number of storage spaces 64 in the drum. Consequently, as sprockets 92 and 94 are of five-tooth type and there are thirty-five storage spaces 64, sprocket assembly 88 is mounted to scoop disc 82 so that the longitudinal axes of the axles 90 incline approximately 8° outwardly from the plane normal to the axis of the drum 60 and the cone angle, which is twice that of the angle of the axles, is 16°.

Each of the inner transfer devices 86 also includes a scoop 100 having a pair of arcuately formed engaging surfaces 101 which cooperate with the associated sprocket assembly 88 in picking up cartridges 14 from drum 60 and guiding them through the associated openings 84 to the outside of scoop disc 82. Clearance cuts 99 are provided in the ends of each of the partitions 62, as best shown in FIG. 4, to permit engagement of the scoops 100 with the end cartridges 14 in the storage spaces 64 for removal therefrom. Pivotally mounted to each of the scoops 100 is an extension member 102 which is provided with a finger portion 103 which forms an extension of the engaging surfaces 101 to assist the scoop in guiding the cartridges 14 removed from the storage spaces 64 to a transmission mechanism 118 which is coaxially disposed between scoop disc 82 and the closed end of cover 70 for rotation at approximately twice the speed of the scoop disc and is arranged for operational cooperation with the inner transfer devices 86 for moving the cartridges 14 from drum 60 as fully described hereinafter. Each of the extension members 102 is hingedly mounted to the respective ones of the scoops 100 by means of a rod 106 because, as will be explained hereinafter, it is necessary for the extension members 102 to be retractable by the cartridges passing from transmission mechanism 118 through cover 70 so as to avoid an interference between such cartridges and the extension members.

The cartridges 14, which are scooped from drum 60 by the pair of inner transfer devices 86 and moved thereby through scoop disc 82 to transmission mechanism 118 which pockets the cartridges so as to be radially disposed relative thereto as shown in FIG. 3 and is more fully explained hereinafter. Each of the two inner transfer devices 86 simultaneously lays a bank of cartridges in transmission 118 and such banks are carried thereby around the axis of drum 60 until they reach a pair of projecting collectors 119, which extend from an exit unit 121 mounted to cover 70, for transferring the cartridges, as hereinafter explained, to conveyor belt 28. The collectors 119 extend through cover 70 and are disposed relative to the empty one of the storage spaces 64 so that the last one of the cartridges in a bank of the cartridges 14 in transmission mechanism 118 preceding the empty space is moved along the collectors 119 while the leading one of the cartridges in the bank formed after such empty storage space is moved under such collectors, as is explained hereinafter, and is especially well illustrated in FIGS. 7–11.

Transmission mechanism 118 includes a retainer ring 120 provided with a ring gear 122 which meshes with the pinion gears 96 so as to be rotatable thereby at a speed which is approximately twice that of scoop disc 82. Extending radially inward from retainer ring 120 are thirty-three equally spaced fins 124 which are so shaped and spaced as to permit the passage of the cartridges 14 therebetween and which are provided with flange portions 126 which slidably engage the extractor grooves of the cartridges 14 for the longitudinal positioning thereof. The fins 124 are included to a plane normal to the axis of drum 60 at an angle of approximately 16° so as to correspond to the conical angle of the adjacent perimeters of the inner sprockets 92 and outer sprockets 94 and such fins extend inwardly for a distance sufficient to maintain the radial alignments of the cartridges. The cartridges 14 are supported parallel to the fins 124, while being carried by transmission mechanism 118, between circular rails 128 disposed around the outer side of scoop disc 82 and circular rails 130 secured to the inside of cover 70.

As has already been explained and as is illustrated schematically by FIGS. 12–16, the two diametrically opposed inner transfer devices 86 simultaneously scoop the two outer layers of cartridges 14 from storage spaces 64. Such figures show how, while one of the inner transfer devices 86 is scooping up a layer of cartridges from drum 60 and laying them in a bank in transmission device 118 for direct pickup by the collectors 119, the other one of the inner transfer devices is scooping up another layer of cartridges and laying them in another bank in the transmission mechanism for subsequent pickup by the collectors 119. Thus, an uninterrupted supply of cartridges 14 is provided for pickup by the collectors 119.

As is shown diagrammatically by FIGS. 7–11, interferences would occur at times between the cartridges 14 being transferred by the collectors 119 and the extension members 102 if such extension members were immovably fixed to the scoops 100. However, as the extension members 102 are pivotally mounted to the scoops 100, the extension members are retractable when engaged by the cartridges 14, as hereinafter described, to avoid interference between such cartridges and the extension members. In addition, the empty one of the storage spaces 64 is coordinated, as hereinbefore explained, and illustrated in FIGS. 7–11, with collectors 119 so that a cartridge 14 will not be in engagement with the extension members 102 while the latter are being retracted and a detour 114 is provided in cover 70 to permit displacement of the first cartridge in the stored bank in transmission mechanism 118 when passing over extension member 102 as shown in FIGS. 7–9.

It will be noted in such figures that the path of the cartridge designated as 34A, which is the last cartridge from the bank A formed in front of the collectors 119 to be engaged thereby, and 1A, which is the first cartridge in bank A formed behind such collectors, are separated sufficiently by virtue of the empty one of the storage spaces 64, to prevent interferences therebetween as sprocket assembly 88 passes the collectors. If there had been a cartridge in sprocket assembly 88 between cartridges 34A and 1A, it would have interfered with the collectors 119, cartridge 1B, which is the first cartridge in bank B, and extension member 102. Also, it is evident that extension member 102 would have interfered with the movement of cartridge 1B if it were not for detour 114.

FIGS. 7–11 also show how extension member 102, when in normal position, cooperates with scoop 100 in guiding the cartridges 14 into a circular path about the axis of sprocket assembly 88 and, moreover, how after round 34A has passed along scoop 100, extension members 102 are retracted by cartridges 1B and 2B so that such cartridges engage the collectors 119, and how the extension members are returned to normal positions by the passage of round 1A into transmission mechanism 118.

By leaving one of the storage spaces 64 empty, there is an interruption in the flow of cartridges picked up by the inner transfer devices 86 from drum 60. Therefore, so that all of the spaces between the fins 124 in transmission mechanism 118 may be filled to obtain an uninterrupted flow of cartridges 14 to the collectors 119, the number of fins are reduced by two from the number of storage spaces 64 and, therefore, such transmission mechanism is speeded up so that the spaces between the fins 124 will register with the tooth spaces in the sprocket assemblies 88. As there are thirty-four of the storage spaces which are filled and thirty-three spaces in transmission mechanism 118, the speed thereof is 68/33 times the speed of scoop disc 82. Thus, for one revolution of scoop disc 82, transmission mechanism 118 has to revolve 2 2/33 times. This speed ratio is provided in large part by the shafts 90 being angularly related to the axis of drum 60 whereby the diameter of ring gear 122 is smaller than that of ring gear 98. The balance of the required speed adjustment is obtained through a special tooth form on ring gear 98 and pinion gears 96. The function of transfer mechanism 80 is further described in patent application, Serial Number 676,454, now Patent No. 2,935,914, filed August 5, 1957, by B. Darsie et al.

Mounted at the entrance end of drum 60 is a transfer mechanism 80' (FIG. 18) which is essentially similar to transfer mechanism 80 already described. In order to facilitate references to the structure of transfer mechanism 80' at the entrance end of supplier 18, the elements therein are designated by the primes of the reference numerals given to the corresponding elements in transfer mechanism 80 at the exit end of the supplier. The function of transfer mechanism 80' is the reverse of that of transfer mechanism 80 as it moves the fired cases 16 transferred thereto from conveyor belt 28 to the entrance ends of the storage spaces 64 in drum 60. Also, connection is made between speed reducer 73 and the moving members of supplier 18 through transfer mechanism 80'. This is accomplished by a bevel gear 129 (FIG. 26) mounted to output shaft 78 which engages with bevel gears 131 mounted to the inner end portions of the shafts 90' whereby rotation of such output shaft by speed reducer 73 is transferred to pinion gears 96' which, consequently, ride around ring gear 98' to rotate scoop disc 82' and inner shell 68 fixed thereto.

Transfer mechanism 80' differs further from transmission mechanism 80 in that it is necessary to mechanically move the extension members 102' out of interference with the fired cases moved through the corresponding ones of the covers 70 to transmission mechanism 118'. This is achieved, as best shown in FIG. 30, by providing an arm 108 on the outer ends of the rods 106' with a roller 110 rotatably mounted to the free end of each of the arms for engagement with a circular track 112 provided around the inside of the corresponding one of the covers 70.

When the rollers 110 are in engagement with track 112, the respective ones of the extension members 102' are in normal extended positions. However, as has been explained before, it is necessary for the extension members 102' to be retracted once during each revolution thereof to avoid an interference between such extension members and the fired cases 16 being moved, as hereinafter described, to transmission mechanism 118'. Therefore, track 112 is interrupted by a stationary cam track 116 which engages the rollers 110 to retract the extension members 102' for avoiding such interference and then returns the rollers into engagement with track 112.

Provided on the side of scoop disc 82, which faces drum 60, are two concentric and annularly aligned helical wiper cams 132, as best shown in FIG. 27, each of which extends from the side of one of the openings 84, away from the direction of rotation of the scoop disc 82, to the near side of the opposite ones of such openings. A pair of cams 132' are similarly disposed on the inner side of scoop disc 82'. The cams 132 and 132' are provided with pairs of radially disposed engaging surfaces which slidingly engage the cases 16 so that the axes thereof are normal to the axis of drum 60. The helical angle of the cams 132 and 132' is such that for 180° of rotation of scoop discs 82 and 82', the cartridges 14 and cases 16 are moved by the cams 132' towards the exit end of drum 60 one round diameter, measured at the bases of cases 16, while space is provided for the advancing cartridges by the angle of cams 132. The engaging surfaces of scoops 100 and 100' are arranged to form a continuation of the surfaces of the cams 132 and 132'.

The scoop discs 82 and 82' are angularly disposed relative to each other so that the distance between the cams 132 and 132' between corresponding points around drum 60 remains constant and such scoop discs are spaced so that such distance is a multiple of the diameter of cases 16 at the bases thereof. Thus, it is seen that the cartridges 14 and cases 16 in drum 60 are moved in a double spiral toward the exit end thereof and, as hereinbefore explained, the pair of helical rods 72 cooperate in engageably maintaining the axis of the cases and/or cartridges normal to the axis of the drum as they are moved.

As has been mentioned hereinbefore, there is mounted to the outside of cover 70 at the exit end of drum 60 an exit unit 121 which removes the cartridges 14 from transmission mechanism 118 and transfers them through a port 140 in the cover to conveyor belt 28. Such exit unit 121, as best shown in FIGS. 3 and 4, includes a housing 142 fixedly secured to cover 70 and the collectors 119 which extend arcuately through port 140 for engagement with the cartridges carried by transmission mechanism 118 so as to be pried therefrom and guided, as hereinafter explained, through the port. A five-tooth sprocket assembly 146 (FIG. 5) is rotatably mounted in housing 142 on a shaft 148 for cooperation with the collectors 119 in transferring the cartridges 14 removed from transmission mechanism 118 to conveyor belt 28 which is slidingly supported during passage through housing 142 by three parallel rails 150. Sprocket assembly 146 includes an inner sprocket 152 which engages the neck portions of the cases 16 and an outer sprocket 154. The ends of the tooth portions of outer sprocket 152 are successively engageable by the ends of the successive ones of the fins 124 to assure positive transfer of the cartridges 14 from transmission mechanism 118 to sprocket member 146 and to transfer rotation of the transfer mechanism to the sprocket assembly.

The cartridges 14 are guided during transfer between transmission mechanism 118 and conveyor belt 28 by a front guide 156 and a rear guide 158 (FIGS. 4 and 6) which encircle shaft 148 to engage the cartridges opposite the collectors 119 when engaged thereby and opposite rails 150 during and after the cartridges are installed in the conveyor belt. Rear guide 158 is slidably received by the extractor grooves in the cases 16 to position the cartridges 14 longitudinally while front guide 156 positions the cartridges angularly as hereinafter described. The rails 150 are so disposed relative to the guides 156 and 158 and the cartridges 14 are so disposed in sprocket assembly 146 that successive ones of the cartridges carried thereby are registrable with successive ones of the links 30 and are pressed thereinto as they come into registry. When the cartridges 14 are jointly engaged by conveyor belt 28 and sprocket assembly 146, the rotation thereof pulls the conveyor belt 28 through housing 142.

As has been described hereinbefore, the cartridges 14 are carried in transmission mechanism 118 at an angle of 16° and, therefore, in order to provide proper rolling support between sprocket assembly 146 and the cartridges in the transmission mechanism, such sprocket assembly is mounted in housing 142 so that the axis of sprocket assembly 146 inclines at an angle of approximately 8° to the cone formed by the axes of the cartridges in the transmission mechanism so that the axis of such sprocket assembly and the axes of the sprocket assemblies 88 in the inner transfer devices 86 intersect on the axis of drum 60 at a common point.

In order to provide proper rolling contact between the cartridges 14 and conveyor belt 28, the axes of the cartridges must be positioned parallel to that of sprocket assembly 146 while being pressed into the conveyor belt. Therefore, the arcuate contour of front guide 156 is so formed that during the 180° rotation of sprocket member 146, while the cartridges 14 are being transferred from transmission mechanism 118, the path of the cartridges, as determined by front guide 156 and rear guide 158, is such that the noses of the cartridges are displaced radially away from the axis of shaft 148 to change the angle between the cartridges and shaft 148 from approximately 8° to 0°.

Mounted to the outside of cover 70 at the entrance end of drum 60 is an entrance unit 160 which functions just the reverse of exit unit 121 as it takes the fired cases 16 from conveyor belt 28 and transfers them through a port 162 (FIG. 26) in the cover to transmission mechanism 118' for disposition therefrom into the storage spaces 64 in drum 60 by transfer mechanism 80'.

Entrance unit 160 is essentially the same as exit unit 121; however, in order to provide the correct direction of rolling contact with the fired cases 16 in conveyor belt 28 and between the fired cases engaged by the sprocket device and transmission mechanism 118' when transferred thereinto, it is necessary to provide a pair of parallel sprocket units, including a first sprocket unit 166 and a second sprocket unit 168 (FIGS. 26 and 27) which are so disposed that the fired cases 16 follow an S-shaped path, rolling 180° around each sprocket unit, when passing from the conveyor belt to the transmission mechanism. The sprocket units 166 and 168 are of five-tooth type and each includes an inner and an outer sprocket wheel.

First sprocket unit 166 is disposed so as to be engageable with successive ones of the fired cases 16 as they are delivered into entrance unit 160 by conveyor belt 28 while second sprocket unit 168 is disposed so that the tooth portions thereof are successively alignable with successive ones of the fins 124' in transmission mechanism 118' and also with successive ones of the tooth portions of the first sprocket.

As conveyor belt 28 is moved into entrance unit 160 by the engagement of sprocket unit 166 with the fired cases 16, the fired cases are separated from the conveyor links 30 by a stripper 170 (FIG. 27) and are guided thereby into position for engagement by first sprocket unit 166. The fired cases 16 are retained in first sprocket unit 166 for 180° rotation thereof, as best shown in FIG. 26, by a front guide 172 and a rear guide 174 and as the cases travel around the axis of such first sprocket unit the axes of the fired cases are maintained parallel thereto by such front and rear guide.

After rotating around first sprocket unit 166, 180°, the fired cases 16 come into registry with successive tooth spaces in second sprocket unit 168 and are engageably moved thereinto by a front scoop 176 and a rear scoop 178 which partially encircle such second sprocket unit to guide the fired cases 16 therein until they come into registry with the spaces between the fins 124' in transmission mechanism 118'. Provided around the shaft of second sprocket unit 168 is a double-armed coiled spring 180 (FIG. 27) which is disposed so that the coils encircle the shaft of the sprocket unit but are anchored to prevent rotation therearound. The arms of spring 180 are disposed so as to be engaged by the fired cases 16 when moved around second sprocket unit 168 to wind the spring and to bias the fired cases radially outward from the second sprocket unit so as to be pressed into the spaces between the fins 124' of transmission mechanism 118' as they come into registry. Front scoop 176 is disposed eccentric to the axis of second sprocket unit 168 so that, as the cases are moved along such front scoop, the noses of the fired cases are displaced towards the axis of such second sprocket unit to change the angle between the axes of the fired cases and the axis of the second sprocket unit from 0° to approximately 8° so that the cases will enter properly into the spaces between the fins 124'.

The sprocket units 166 and 168 are rotated through the meshing engagement of a bevel gear 182 (FIG. 26) mounted to output shaft 78 with a bevel gear 184 axially connected to first sprocket unit 166. A pinion gear 186 mounted axially to the outer end of first sprocket unit 166 is connected to a pinion gear 188 mounted to second sprocket unit 168 by a gear train 190 to provide counter-rotation of such second sprocket unit respective to such first sprocket unit. The joint engagement of a case 16 by first sprocket unit and conveyor belt 28 during transfer therefrom transfers rotation of the first sprocket unit thereto. After the cases 16 are stripped therefrom, the conveyor belt 28 continues to exit unit 121, bypassing drum 60, where the empty links 30 are filled with cartridges 14 as hereinbefore explained.

Shown in FIG. 33 is an alternate embodiment of supplier 18 for use when the fired cases 16 may be jettisoned. Included in such alternate supplier, which is noted at 200 and which is essentially the same as supplier 18 except that transfer mechanism 80' and transmission mechanism 118 at the entrance end of drum 60 an entrance unit 160 are eliminated and in the place thereof is a bulkhead 202 which has a diameter sufficiently smaller than that of drum 60 so that the bulkhead is slidable therein towards the exit end. Bulkhead 202 also includes a circular clearance hole 204 which slidingly receives inner shell 68. Slots 206 extend radially inward from the outer periphery of bulkhead 202 to slidingly receive the partitions 62 and such slots cooperate with the partitions in preventing the rotation of such bulkhead. A screw member 208 is mounted over inner shell 68 and is provided with double threads 210 which angularly correspond to the pitch of the helical rods 72 and which slidingly receive rollers 212 mounted to bulkhead 202 so that such bulkhead is moved upwardly in drum 60 between the helical rods with the rotation of the inner shell.

Provided on the upper side of bulkhead 202 is a pair of cam surfaces 214 which correspond to the wiper cams 132' and which cooperate with helical rods 72 and threads 210 in moving the cartridges 14 in a double spiral towards transfer mechanism 80 on the exit end of drum 60.

With the elimination of transfer mechanism 80' through which supplier 18 is energized, the positions of output shaft 78 and input shaft 76 are reversed so that bevel gear 129 on the output shaft is engageable with bevel gears provided on the shafts 90 similar to the bevel gears 131 mounted on the shafts 90' to transfer the rotation of such output shaft to transfer mechanism 80. Also, with this alternate mechanism, the conventional feeder for gun 12 need not be replaced by loading unit 34 and conveyor belt 28 is movable between such conventional gun feeder and exit unit 121.

*Operation*

When gun 12 is readied for initial operation and feeding device 17 is to be used, the feeding device and the gun including conveyor belt 28 are completely filled with cartridges 14 with the exception of the portion of the conveyor belt which extends between exit unit 121 and entrance unit 160. Thus, the cartridges initially placed in conveyor belt 28 between gun 12 and entrance unit 160 add to the initial supply of cartridges available for the gun.

Gun 12 is fired when the electric circuit thereto is closed, whereby motor 22 is energized to actuate the operating mechanism of the gun including rotor 24 which delivers the cartridges therein to the firing station of the gun, and the bolts 26 which simultaneously move the cartridges forwardly in the rotor for chambering in successive ones of the barrels 23 when rotating through the firing station. At the same time, conveyor belt 28 is moved for delivering fresh cartridges 14 to gun 12 and taking the fired cases 16 therefrom and supplier 18 is actuated to keep the conveyor belt filled with cartridges and to store the fired cases.

After the cartridges 14 are discharged in the firing station, the fired cases 16 are extracted into rotor 24 by the bolts 26 and when in alignment with the tooth spaces in loading sprocket 42 the fired cases are moved thereinto for transfer thereby into successive ones of the links 30 as conveyor belt 28 is moved through loading unit 34. The fired cases 16 are carried by conveyor belt 28 to entrance unit 160 where they are stripped from the engaging links and transferred to transmission mechanism 118' for removal by the two inner transfer devices 86' mounted to scoop disc 82' to the entrance ends of the storage spaces 64 in drum 60. During the transfer from transmission mechanism 118' to drum 60, the cases are smoothly decelerated from gun speed velocity to a low velocity by the interposition of scoop disc 82', which rotates at one-half the speed of transmission mechanism 118', and the cooperation of the inner transfer devices 86' mounted to the scoop disc. It is noted that the cases 16, when in transmission mechanism 118', are moving at gun velocity and that the rate of movement of the cases and cartridges 14 through the storage spaces 64 is 1/34 of the rate of movement of the cartridges and cases in conveyor assembly 20.

The fired cases 16 are installed in the storage spaces 64 simultaneously with the removal of the cartridges 14 from the opposite ends thereof so that the number of fired cases and cartridges in the storage spaces is always constant. When the fired cases 16 are transferred to the storage spaces 64, they are immediately engaged by the wiper cams 132' to progressively move the columns of cases and cartridges towards the exit end of drum 60 in a double spiral with the pair of helical rods 72 maintaining the axes of the cartridges and fired cases normal to the axis of drum 60.

Simultaneously therewith, the cartridges 14 are removed from the exit ends of the storage spaces 64 by the inner transfer devices 86 and placed in transmission mechanism 118 with a smooth acceleration from the low velocity of movement along the empty spaces 64 to the speed of gun 12 as hereinbefore explained. The cartridges 14 are carried by transmission mechanism 118 to exit unit 121 for transfer thereby to conveyor belt 28 and loading unit 34 to fill the requirements of gun 12.

When supplier 200 is used, the operation is similar to that described for feeding device 17 except that, as the fired cases 16 are not returned to the supplier to be used in moving the cartridges 14 in drum 60 towards the exit end thereof, the cartridges 14 are moved at a constant rate through the drum by the threaded engagement of bulkhead 202 with inner shell 68.

From the foregoing, it is clearly apparent that the feeding device of this invention provides a considerable advancement in the art with its successful elimination of many problems which have affected the successful feeding of cartridges to rapid firing guns heretofore. This feeding device includes all the advantages of the conventional systems which feed cartridges to guns by linked belt without the disadvantages of such systems as the cartridges are controllably fed by a linked belt to the gun but are disengageably stored in a supply container to reduce the size and weight of the supply unit.

In comparison with a conventional storage system for a gun installation, with a complement of 1200 rounds of caliber .50 ammunition in which the ejected cases and links are returned to the supplying unit, the supplier unit of this invention occupies 34,000 cu. in. while the conventional system occupies 51,600 cu. in. From the standpoint of weight, the conventional system weighs 347 lbs. while the linkless supply system of this invention weighs 300 lbs.

Moreover, the forces of acceleration and deceleration which cause separation and the stretching of the links in the conventional systems are considerably reduced with the inertia of the conveyor belt being overcome at three points therearound; namely, at loading unit 34, exit unit 121 and entrance unit 160 and after the initial surge, when the conveyor belt is first actuated, the conveyor belt continues to move at a constant velocity. Moreover, the cartridges are gradually accelerated to and decelerated from gun speed while in the supplier and disengaged from the conveyor belt.

The feeding device of this invention is also distinguished for its ease of manufacture, positiveness of operation and sturdiness of construction.

Although a particular embodiment of the invention has been described in detail herein, it is evident that many variations may be devised within the spirit and scope thereof and the following claims are intended to include such variations.

We claim:

1. The combination of a gun provided with an operating motor, an endless conveyor belt mounted to said gun for carrying cartridges thereto, said conveyor belt being composed of a plurality of connected cartridge-gripping links each adapted for lateral installation of a cartridge thereinto and side-stripping of the cartridge therefrom, a drum provided with a plurality of radially disposed partitions extending from one end of said drum to the other and spaced to slidingly receive a plurality of the cartridges in longitudinal columns, means for transferring the cartridges from said conveyor belt to said gun, a transfer mechanism mounted at one end of said drum and connected to said gun for synchronized operation therewith, said transfer mechanism being provided with a scoop disc with a pair of inner transfer devices mounted thereto, said pair of inner transfer devices being adapted to remove cartridges from the adjacent ends of said columns for transferral to a transmission mechanism operationally connected to said pair of inner transfer devices for rotation thereby at approximately twice the speed of said scoop disc and so as to feed the cartridges at a suitable rate to said gun, said transmission mechanism being provided with radial fins angularly spaced to receive a cartridge between pairs thereof, an exit unit including sprocket means having meshing engagement with said fins for synchronized rotation with said transmission mechanism and disposed to transfer the cartridges therein to said conveyor belt, and means in said drum for moving the cartridges therein in a double spiral to said pair of inner transfer mechanisms and to maintain the axes of the cartridges normal to the axis of said drum.

2. The combination as recited in claim 1 including a pair of substantially semicircular wiper cams provided on the side of said scoop disc facing said columns, said wiper cams being disposed so as to engage the end ones of the cartridges in said columns and so as to lead angularly from one of said inner transfer devices to the other the distance of the diameter of the cartridges at the base thereof in the direction of rotation of said scoop disc, and wherein said means in said drum for moving the cartridges therein in a double spiral to said pair of inner transfer mechanisms include an inner cylindrical shell axially disposed in said drum and connected to said transfer mechanism for rotation with said scoop disc, a bulkhead disposed for engagement with the cartridges at the outer ends of said columns and for slidable nonrotating movement in said drum towards said transfer mechanism, cooperating thread means on said inner shell and said bulkhead for progressively advancing said bulkhed so as to move the cartridges in said columns toward said pair of inner transfer mechanisms for engagement thereby, and helical rods mounted to said inner shell for rotation therewith, said helical rods being disposed to slidingly engage the front portions of the cartridges to maintain the axes thereof normal to the axis of said drum during movement to said inner transfer mechanisms.

3. The combination as recited in claim 2 wherein said bulkhead has a diameter sufficiently smaller than said drum to be slidable therein and includes slotted portions for slidingly receiving said partitions and slidingly securing said bulkhead against rotation, and a central opening for slidingly receiving said inner shell, and a pair of cam surfaces on the inside of said bulkhead, said cam surfaces being disposed for engagement with the last ones of the cartridges in said columns and having an angular development corresponding to that of said wiper cams on said scoop disc to cooperate therewith and with said helical rods in moving the cartridges in said drum to said pair of inner transfer devices in a double spiral.

4. The combination including a gun provided with a rotatable group of barrels for the discharge of cartridges therein, a rotatable rotor for aligning the cartridges received thereby with corresponding ones of the barrels and bolts respectively corresponding to the barrels adapted for longitudinally moving the cartridges from the rotor into the barrels and extracting the fired cartridge cases therefrom; an endless conveyor belt communicating with said gun for delivering the cartridges thereto and the fired cases therefrom, said conveyor belt being composed of a plurality of connected cartridge-gripping links each adapted for lateral installation of a cartridge thereinto and side-stripping of the cartridge therefrom; a loading unit operationally disposed between said gun and said conveyor belt for successively transferring the cartridges from said links to the rotor and the fired cartridge cases therefrom into said links; a supplier operationally connected to said conveyor belt, said supplier including means for successively transferring the cartridges from a stored disconnected supply thereof in said supplier to successive one of said links, means for transferring successive ones of the fired cartridge cases from said links to the stored supply simultaneous with the removal of the cartridges therefrom and means for moving the fired cartridge cases against the cartridges in the stored supply to progressively push the cartridges therethrough and into position for removal therefrom; and actuating means for simultaneously energizing said gun, conveyor belt and supplier to move the cartridges and fired cases through said gun, supplier and conveyor belt in an endless flow.

5. The combination as recited in claim 4 wherein said actuating means is disposed to energize said conveyor belt simultaneously at said loading unit and at said supplier where the cartridges are transferred therefrom and the fired cartridge cases are transferred thereto to reduce the forces of acceleration and deceleration imparted to said conveyor belt by the changes in the velocity thereof.

6. The combination as recited in claim 4 wherein said loading unit includes a housing disposed for the passage of said conveyor belt therethrough and mounted to said gun adjacent the rotor, rail means for slidingly supporting said conveyor belt during passage thereof through said housing, a feeder sprocket connected by gear means to the rotor for rotation therewith and disposed for engagement with successive ones of the cartridges in said conveyor belt to draw said conveyor belt into said housing, a stripper guide disposed to engage the cartridges in said conveyor belt when moved into said housing for stripping the cartridges from said conveyor belt, said feeder sprocket being disposed for cooperation with a guide surface on said stripper guide for transferring the stripped cartridges to the rotor, a loading sprocket connected by gear means to said feeder sprocket for rotation thereby in the same direction, said loading sprocket being disposed to receive the fired cases from the rotor and move such fired cases through the cooperation of another guide surface on said stripper guide to said conveyor belt for installation therein to replace the cartridges previously removed therefrom.

7. The combination including a gun provided with barrels for the discharge of cartridges having tapered cases and bolt means for chambering the cartridges in the barrels and extracting the fired cases therefrom; an endless conveyor belt operationally connected to said gun for simultaneously conveying the cartridges thereto and the fired cases therefrom; said conveyor belt being composed of a plurality of connected cartridge-gripping links of side-stripping type; a drum adapted to store a supply of the cartridges in a plurality of columns longitudinally disposed in said drum and to receive the fired cases; a first transfer mechanism mounted on one end of said drum, said first transfer mechanism including a scoop disc mounted for rotation about the axis of said drum, inner transfer means including sprockets for removing cartridges from the adjacent ends of said columns and moving the cartridges to the opposite side of said scoop disc and a transmission mechanism arranged to receive the cartridges from said inner transfer means so that the axes of the cartridges are angularly displaced from a plane normal to the axis of said drum according to the pitch circles of said sprockets to provide proper rolling contact between said sprockets and the end cartridges in the columns; an exit unit for removing the cartridges from said transmission mechanism and installing them in said links, said exit unit including a housing for the passage of said conveyor belt therethrough, a sprocket assembly rotatably mounted in said housing to engage successive ones of the cartridges in said transmission mechanism, said sprocket assembly being disposed so that the axis thereof inclines respective to the axes of the cartridges in said transmission mechanism at approximately one-half the angle formed between the axis of the cartridges carried by said transmission mechanism and a plane normal to the axis of said drum and guide means slidingly contactable by the cartridges engaged by said sprocket assembly to guide such cartridges to said conveyor belt for installation in said links thereof, said guide means including a front and a rear guide member disposed to radially displace the front end of the cartridges to a position wherein the axes of the cartridges are disposed parallel to the axis of said sprocket assembly when the cartridges are installed in said links; a second transfer mechanism mounted to the opposite end of said drum for installing fired cases in the adjacent ends of said columns to replace the cartridges removed from the opposite ends of said columns by said first transfer mechanism; and an entrance unit arranged for stripping the fired cases from said conveyor belt and transferring them to said second transfer mechanism for transferral thereby to said drum.

8. The combination as recited in claim 7 wherein said transmission mechanism is adapted to carry the fired cartridge cases with the axes thereof disposed angularly to a plane normal to the axis of said drum, and wherein said entrance unit includes a housing, a first sprocket unit rotatably mounted in said housing for successive engagement with the fired cartridge cases in said conveyor belt, a second sprocket unit rotatably disposed in said housing parallel to said first sprocket unit and so as to be registrable with said first sprocket unit to receive the fired cases therefrom and with said transmission mechanism to transfer the fired cartridge cases thereto, a stripper engageable with the fired cases for removal thereof from said conveyor belt when engaged by said first sprocket unit, guide means slidingly engaged by the fired cases engaged by said first sprocket unit for guiding such fired cartridge cases into engagement with said second sprocket unit, scoop means partially encircling said second sprocket unit to guide the fired cartridge cases engaged thereby into engagement with said transmission mechanism, said guide means being disposed so as to radially displace the fired cases respective to the axis of said second sprocket unit while being carried thereby so that the fired cases are receivable by said transmission mechanism, armed springs mounted around said second sprocket unit so as to be loadable by the fired cases when transferred thereto and so as to bias the fired cartridge cases into engagement with said transmission mechanism when in registry therewith, and gear means for connecting said second sprocket unit to said first sprocket unit for counterrotation respective thereto.

9. The combination of a gun provided with a rotary group of barrels rotated by an operating motor, an endless conveyor belt disposed for rotation by the operating motor to convey cartridges to said gun, said conveyor belt being composed of a plurality of connected cartridge-gripping links each being adapted for lateral installation of a cartridge thereinto and side stripping the cartridge therefrom, a drum for storing a plurality of disconnected cartridges, a transfer mechanism mounted on one end of said drum and operationally connected to the operating motor for synchronized operation with said gun, means in said transfer mechanism for serially removing the cartridges from said drum and accelerating the removed cartridges to gun speed, a transmission mechanism for receiving the cartridges from said transfer mechanism, an exit unit including sprockets meshingly engaged with said transmission mechanism for rotation thereby, collectors disposed for cooperation with said sprockets for prying the cartridges from said transmission mechanism and guide means disposed for cooperation with said sprockets for installing the removed cartridges in successive ones of said links in said conveyor belt and simultaneously transferring the torque of said sprockets thereto, and means for moving the cartridges through said drum towards said transfer mechanism.

10. The combination of a gun provided with a rotary group of barrels rotated by an operating motor, an endless conveyor belt disposed for rotation by the operating motor to convey cartridges to said gun, said conveyor belt being composed of a plurality of connected cartridge-gripping links each being adapted for lateral installation of a cartridge thereinto and side-stripping the cartridge therefrom, a drum for storing a plurality of disconnected cartridges, a transfer mechanism mounted on one end of said drum and operationally connected to the operating motor for synchronized operation with said gun, means in said transfer mechanism for serially removing the cartridges from said drum and accelerating the removed cartridges to gun speed, a transmission mechanism for receiving the cartridges from said transfer mechanism, an exit unit including sprockets energized by the operating motor through said transmission mechanism and means disposed for cooperation with said sprockets for removing cartridges from said drum and installing the removed cartridges in successive ones of said links in said conveyor belt, a bulkhead mounted for axial displacement in said drum against the cartridges stored therein, and screw means connected to the operating motor for rotation thereby and to said bulkhead for progressively moving the cartridges in said drum into position to be removed by said transfer mechanism in synchronism with the needs of said gun.

11. The combination including an automatic gun having a rotatable group of barrels and a rotor for aligning cartridges with the barrels and receiving the fired cases therefrom; a supplier including a drum for storing disconnected cartridges and fired cases, a first transfer mechanism mounted on one end of said drum, said first transfer mechanism including a rotatable transmission mechanism and means for transferring the cartridges from said drum thereto, and a second transfer mechanism mounted on the opposite end of said drum for transferring fired cases received thereby into said drum to replace the cartridges removed therefrom; an endless conveyor belt composed of a plurality of connected cartridge-gripping links each adapted for lateral installation of a cartridge thereinto and side stripping the cartridge therefrom; a motor for actuating the rotor; a loading unit for slidingly supporting one section of said conveyor belt, said loading unit including sprockets connected to the rotor for rotation thereby and to said conveyor belt for transferring rotation of the rotor thereto, means disposed in said loading unit for cooperation with said sprockets for stripping the cartridges from said conveyor belt and transferring the stripped cartridges to the rotor and for installing the fired cases into said links; means for transferring the torque of said motor to a speed reducer unit in said supplier; means for transferring the torque of said speed reducer unit to said transmission mechanism; an exit unit mounted on said supplier for operational cooperation with said first transfer mechanism and slidingly supporting a section of said conveyor belt, said exit unit being provided with sprocket means disposed for meshing engagement with fins on said transmission mechanism for transferring rotation thereof to said sprocket means and for engagement with the cartridges in said transmission mechanism, and guide means disposed for cooperation with said sprocket means for removing the cartridges from said transmission mechanism and installing the removed cartridges in successive one of said links in said conveyor belt to transfer the torque of said sprocket means to said conveyor belt when a cartridge is jointly engaged by said sprocket means and one of said links; an entrance unit mounted to said supplier for cooperation with said second transfer mechanism and for slidingly supporting a section of said conveyor belt, said entrance unit being provided with a sprocket unit connected by gear means to said speed reducer unit for rotation thereby, said sprocket units being adapted to cooperate with means for stripping the fired cases from said conveyor belt and transferring the stripped fired cases to said conveyor and to transfer the torque of said sprocket units to said conveyor belt when a fired case is jointly engaged by said sprocket units and one of said links; whereby the torque of said motor is transferred to said conveyor belt at three points to reduce the forces of acceleration and deceleration imparted to said conveyor belt by changes in the velocity thereof.

References Cited in the file of this patent

UNITED STATES PATENTS

| | | |
|---|---|---|
| 681,439 | Carr | Aug. 27, 1901 |
| 1,330,873 | Hulse | Feb. 17, 1920 |
| 1,552,863 | Methlin | Sept. 8, 1925 |